United States Patent
Freericks et al.

(10) Patent No.: US 8,225,404 B2
(45) Date of Patent: Jul. 17, 2012

(54) TRUSTED SECURE DESKTOP

(75) Inventors: Helmuth Freericks, Palm Beach Gardens, FL (US); Oleg Kouznetsov, Tequesta, FL (US); John C. Sharp, Tequesta, FL (US)

(73) Assignee: Wontok, Inc., Palm Beach Gardens, FL (US)

( * ) Notice: Subject to any disclaimer, the term of this patent is extended or adjusted under 35 U.S.C. 154(b) by 668 days.

(21) Appl. No.: 12/356,724

(22) Filed: Jan. 21, 2009

(65) Prior Publication Data

US 2009/0187991 A1  Jul. 23, 2009

Related U.S. Application Data

(60) Provisional application No. 61/022,685, filed on Jan. 22, 2008.

(51) Int. Cl.
 G06F 11/00 (2006.01)
 H04L 29/06 (2006.01)
(52) U.S. Cl. .......................................... 726/24; 713/164
(58) Field of Classification Search .................. 726/24; 713/164
 See application file for complete search history.

(56) References Cited

U.S. PATENT DOCUMENTS

| | | | |
|---|---|---|---|
| 5,504,814 A * | 4/1996 | Miyahara | 726/4 |
| 6,732,279 B2 | 5/2004 | Hoffman | |
| 6,772,345 B1 | 8/2004 | Shetty | |
| 6,866,581 B2 | 3/2005 | Martinek et al. | |
| 6,871,192 B2 | 3/2005 | Fontana et al. | |
| 6,968,462 B2 | 11/2005 | Challener et al. | |
| 7,080,407 B1 | 7/2006 | Zhao et al. | |
| 7,086,086 B2 | 8/2006 | Ellis | |
| 7,269,851 B2 | 9/2007 | Ackroyd | |
| 7,322,042 B2 * | 1/2008 | Srinivasan et al. | 726/17 |
| 7,325,193 B2 | 1/2008 | Edd et al. | |
| 7,353,533 B2 | 4/2008 | Wright et al. | |
| 7,392,534 B2 | 6/2008 | Lu et al. | |
| 7,418,504 B2 | 8/2008 | Larson et al. | |
| 7,478,420 B2 | 1/2009 | Wright et al. | |
| 7,516,476 B1 | 4/2009 | Kraemer et al. | |
| 7,685,279 B2 | 3/2010 | Miltonberger et al. | |
| 7,716,731 B2 | 5/2010 | Short et al. | |
| 7,827,611 B2 | 11/2010 | Kouznetsov et al. | |
| 7,987,432 B1 * | 7/2011 | Grechishkin et al. | 715/778 |
| 2002/0004902 A1 | 1/2002 | Toh et al. | |
| 2002/0029342 A1 | 3/2002 | Keech | |

(Continued)

OTHER PUBLICATIONS

GreenBorder Pro 2.9 Article—Reviews by PC Magazine (PCMAG.com) [online]. Reviewed on Jun. 24, 2006. Retrieved from the Internet on Apr. 30, 2008: <URL: http://www.pcmag.com/article2/0,2704,1980991,00.asp.

*Primary Examiner* — Techane Gergiso
(74) *Attorney, Agent, or Firm* — Fox Rothschild, LLP; Robert J. Sacco

(57) ABSTRACT

Systems and methods for simultaneously protecting software components (150) installed on a computer system (102) against malware. The methods involve executing a first end user application ($318_1$, $318_2$, . . . , $318_p$) to the computer system (102) which execute in user mode on a trusted secure desktop (904). The trusted secure desktop is configured to run simultaneously with an unsecure desktop (902). The methods also involve performing a security service operation to protect the first end user application against malware. The security service operations include a keylogger prevention service operation, a code injection prevention service operation, a screen scraper protection service operation, a process termination prevention service operation, or a Domain Name System service operation.

26 Claims, 12 Drawing Sheets

U.S. PATENT DOCUMENTS

| | | | |
|---|---|---|---|
| 2002/0166063 A1 | 11/2002 | Lachman et al. | |
| 2002/0184255 A1 | 12/2002 | Edd et al. | |
| 2003/0002072 A1 | 1/2003 | Berkema et al. | |
| 2003/0005044 A1 | 1/2003 | Miller et al. | |
| 2003/0079143 A1 | 4/2003 | Mikel et al. | |
| 2003/0093400 A1 | 5/2003 | Santosuosso | |
| 2003/0120605 A1 | 6/2003 | Fontana et al. | |
| 2003/0131249 A1 | 7/2003 | Hoffman | |
| 2003/0159070 A1 | 8/2003 | Mayer et al. | |
| 2003/0177389 A1 | 9/2003 | Albert et al. | |
| 2003/0212890 A1* | 11/2003 | Dircks et al. | 713/164 |
| 2003/0217287 A1* | 11/2003 | Kruglenko | 713/200 |
| 2004/0034794 A1 | 2/2004 | Mayer et al. | |
| 2004/0088570 A1 | 5/2004 | Roberts et al. | |
| 2004/0098485 A1 | 5/2004 | Larson et al. | |
| 2004/0123153 A1 | 6/2004 | Wright et al. | |
| 2004/0128549 A1* | 7/2004 | Poisner | 713/201 |
| 2004/0249974 A1 | 12/2004 | Alkhatib et al. | |
| 2005/0055578 A1 | 3/2005 | Wright et al. | |
| 2005/0055588 A1* | 3/2005 | Nalawadi et al. | 713/300 |
| 2005/0066202 A1* | 3/2005 | Evans et al. | 713/202 |
| 2005/0071282 A1 | 3/2005 | Lu et al. | |
| 2005/0138395 A1 | 6/2005 | Benco et al. | |
| 2005/0149726 A1 | 7/2005 | Joshi et al. | |
| 2005/0172015 A1 | 8/2005 | Rana et al. | |
| 2005/0183143 A1 | 8/2005 | Anderholm et al. | |
| 2005/0204165 A1* | 9/2005 | Nason et al. | 713/201 |
| 2005/0216957 A1 | 9/2005 | Banzhof et al. | |
| 2005/0229250 A1 | 10/2005 | Ring et al. | |
| 2006/0010252 A1 | 1/2006 | Miltonberger et al. | |
| 2006/0031940 A1 | 2/2006 | Rozman et al. | |
| 2006/0036731 A1 | 2/2006 | Mossman et al. | |
| 2006/0064755 A1 | 3/2006 | Azadet et al. | |
| 2006/0090196 A1 | 4/2006 | van Bemmel et al. | |
| 2006/0101128 A1 | 5/2006 | Waterson | |
| 2006/0101282 A1 | 5/2006 | Costea et al. | |
| 2006/0130141 A1 | 6/2006 | Kramer et al. | |
| 2006/0143706 A1 | 6/2006 | Kawasaki et al. | |
| 2006/0206485 A1 | 9/2006 | Rubin et al. | |
| 2006/0206936 A1 | 9/2006 | Liang et al. | |
| 2006/0224753 A1 | 10/2006 | Hama et al. | |
| 2006/0236391 A1 | 10/2006 | Kim et al. | |
| 2006/0259967 A1 | 11/2006 | Thomas et al. | |
| 2006/0265761 A1 | 11/2006 | Rochette et al. | |
| 2007/0011741 A1 | 1/2007 | Robert et al. | |
| 2007/0022287 A1 | 1/2007 | Beck et al. | |
| 2007/0036300 A1 | 2/2007 | Brown et al. | |
| 2007/0055711 A1 | 3/2007 | Polyakov et al. | |
| 2007/0067833 A1 | 3/2007 | Colnot | |
| 2007/0094496 A1 | 4/2007 | Burtscher | |
| 2007/0094723 A1 | 4/2007 | Short et al. | |
| 2007/0101148 A1* | 5/2007 | Schutz et al. | 713/182 |
| 2007/0101435 A1* | 5/2007 | Konanka et al. | 726/27 |
| 2007/0162975 A1 | 7/2007 | Overton et al. | |
| 2007/0234061 A1 | 10/2007 | Teo | |
| 2007/0240212 A1* | 10/2007 | Matalytski | 726/22 |
| 2007/0245343 A1 | 10/2007 | Shannon et al. | |
| 2007/0271189 A1 | 11/2007 | Morten et al. | |
| 2008/0016339 A1 | 1/2008 | Shukla | |
| 2008/0034419 A1 | 2/2008 | Mullick et al. | |
| 2008/0040797 A1* | 2/2008 | Schwartz et al. | 726/19 |
| 2008/0178006 A1* | 7/2008 | Mullor et al. | 713/184 |
| 2009/0037976 A1 | 2/2009 | Teo et al. | |
| 2009/0044266 A1 | 2/2009 | Sharp et al. | |
| 2009/0187763 A1 | 7/2009 | Freericks et al. | |
| 2010/0024036 A1* | 1/2010 | Morozov et al. | 726/26 |

* cited by examiner

TRUSTED SECURE DESKTOP

CROSS REFERENCE TO RELATED APPLICATIONS

This non-provisional U.S. patent application claims the benefit of U.S. Provisional Patent Application No. 61/022,685 entitled "TRUSTED SECURE DESKTOP" filed on Jan. 22, 2008 by inventors Helmuth Freericks, Oleg Kouznetsov, and John C. Sharp.

BACKGROUND OF THE INVENTION

1. Statement of the Technical Field

The invention concerns computing systems. More particularly, the invention concerns computing systems and methods for providing a trusted secure desktop.

2. Description of the Related Art

Data can be used and stored on a user computer or a server computer that is accessible via the Internet for a variety of purposes. Such purposes include, but are not limited to, online banking, stock trading, and social data exchange. There is an increasing need to ensure a sufficient high level of security whenever such data is created, updated, viewed, or transferred to another medium without such actions being compromised by hackers and malware. Such malware can include, but is not limited to, keyloggers, rootkits, screen scrapers, and viruses. The method often used by hackers and malware compromises the use of a keyboard, a display screen, or windows clipboard rather than files. This is because the access of files and the transfer of files from an end-user device are typically well protected by traditional anti-malware software.

Notably, conventional computer security software is typically reactive in nature, and therefore requires regular updates. As such, a possibility exists that hackers, viruses, spyware, malware and malicious software may penetrate the defenses put in place to protect the end-user from harm. In view of the forgoing, there is a need for a system that facilitates data security when data is accessed locally or over the Internet.

Prevention of the above described threats poses a very serious problem for computer security software vendors. This is due to the increasing complexity of threats to which end-user devices are exposed. In general, conventional security solutions provided by computer security software vendors address certain aspects of the overall security requirements and often assume that the computer is protected by traditional anti-virus or anti-malware solutions. As such, there is a need for a system that facilitates comprehensive protection of data used on an end-user device and across a network (e.g., the Internet).

SUMMARY OF THE INVENTION

This summary is provided to comply with 37 C.F.R. §1.73, presenting a summary of the invention briefly indicating the nature and substance of the invention. It is submitted with the understanding that it will not be used to interpret or limit the scope or meaning of the claims.

Embodiments of the present invention concern methods for simultaneously protecting software components installed on a computer system against malware. The methods involve executing a trusted secure desktop simultaneously with an unsecure desktop of a computer system. The methods also involve executing one or more first end user applications (e.g., a web browser application) installed on the computer system. Each of the first end user applications executes in user mode on the trusted secure desktop. The methods further involve performing one or more security service operations at the client computer to protect the first end user applications against malware.

The security service operations are performed by the trusted secure desktop and/or an underlying security software. The security software includes an underlying user mode software operative to communicate with the trusted secure desktop. The security software also includes an underlying kernel mode software operative to communicate with the underlying user mode software and an operating system of the computer system. The security service operations can include, but are not limited to, a keylogger prevention service operation, a code injection prevention service operation, a screen scraper protection service operation, a process termination prevention service operation, and/or a Domain Name System (DNS) service operation.

According to an aspect of the present invention, the first end user application is a web browser application. The web browser application can be stored in a storage device of the computer system in an encrypted form. In such a scenario, the web browser application is decrypted prior to being executed on the trusted secure desktop.

According to an aspect of the present invention, the keylogger prevention service operation comprises: temporarily breaking all connections between the operating system of the computer system and first keyboard device drivers of the computer system; providing a second keyboard device driver that has been verified to be an unpatched or untampered device driver; and establishing a connection between the second keyboard device driver and the operating system of the computer system. The keylogger prevention service operation also comprises: intercepting at least one function used to patch memory images of the second keyboard device driver; and preventing the function from succeeding if the function is being used by malware. The code injection prevention service operation comprises: monitoring code injection functions being performed by the computer system; and preventing at least one of the code injection functions from succeeding if the code injection function is being used by malware.

The screen scraper protection service operation comprises: monitoring functions performed by the computer system used to intercept or redirect information communicated to and from a keyboard, a mouse, and a display screen; intercepting the plurality of functions; preventing at least one of the functions from succeeding if the function is a non-display screen function and is determined to be utilized by malware or a second end-user application running on the second desktop; and performing the function against a screen size of a height of zero pixels and a width of zero pixels if the function is a display screen function and is determined to be utilized by malware or the second end-user application running on the second desktop.

The DNS service operation comprises generating a DNS resolution request at the computer system and communicating the DNS resolution request from the computer system to a DNS server computer system for translation of a domain name for a network site to a numerical identifier. The DNS service operation also comprises receiving the numerical identifier at the computer system.

According to another aspect of the present invention, the methods involve scanning data stored in a memory device of the computer system associated with user mode and kernel mode applications running on the unsecure desktop for malware prior to launching the trusted secure desktop and the first end user application. The methods also involve preventing the trusted secure desktop and/or the first end user application from launching if the data includes the malware. The methods further involve running an anti-virus/spyware software on the unsecure desktop to identify and remove the malware from the computer system. The trusted secure desktop and/or the first end user application are allowed to be launched subsequent to the removal of the malware from the client computer.

Embodiments of the present invention also concern computer systems implementing the above described methods. The computer systems include a computer readable medium having instructions stored thereon and a processing device communicatively coupled to the computer readable medium. The processing device is configured for executing the instructions that cause the computer system to execute the trusted secure desktop simultaneously with an unsecure desktop, execute the first end user application on the trusted secure desktop, and performing one or more security service operations to protect the first end user application against malware.

According to an aspect of the present invention, the first end user application can include a web browser application. If the web browser application is stored in the computer system in an encrypted format, the processing device decrypts the web browser application prior to being executed on the trusted secure desktop.

According to another aspect of the present invention, the processing device is configured for scanning data stored in the computer system associated with the user mode and kernel mode applications running on the unsecure desktop for malware prior to launching the trusted secure desktop and the first end user application. The processing device is also configured for preventing the trusted secure desktop and/or the first end user application from launching if the data includes the malware. The processing device is further configured for launching an anti-virus/spyware software on the unsecure desktop to identify and remove the malware from the computer system. The trusted secure desktop and/or the first end user application are allowed to be launched subsequent to the removal of the malware from the client computer.

Embodiments of the present invention further concern a computer readable medium stored with a program for causing a computer to function as a server computer. The server computer is to be attached to a network including at least one client computer. The server computer includes a responding part for when receiving a security software download request from the client computer obtaining files for the security software and communicating the files to the client computer.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Figure 1:
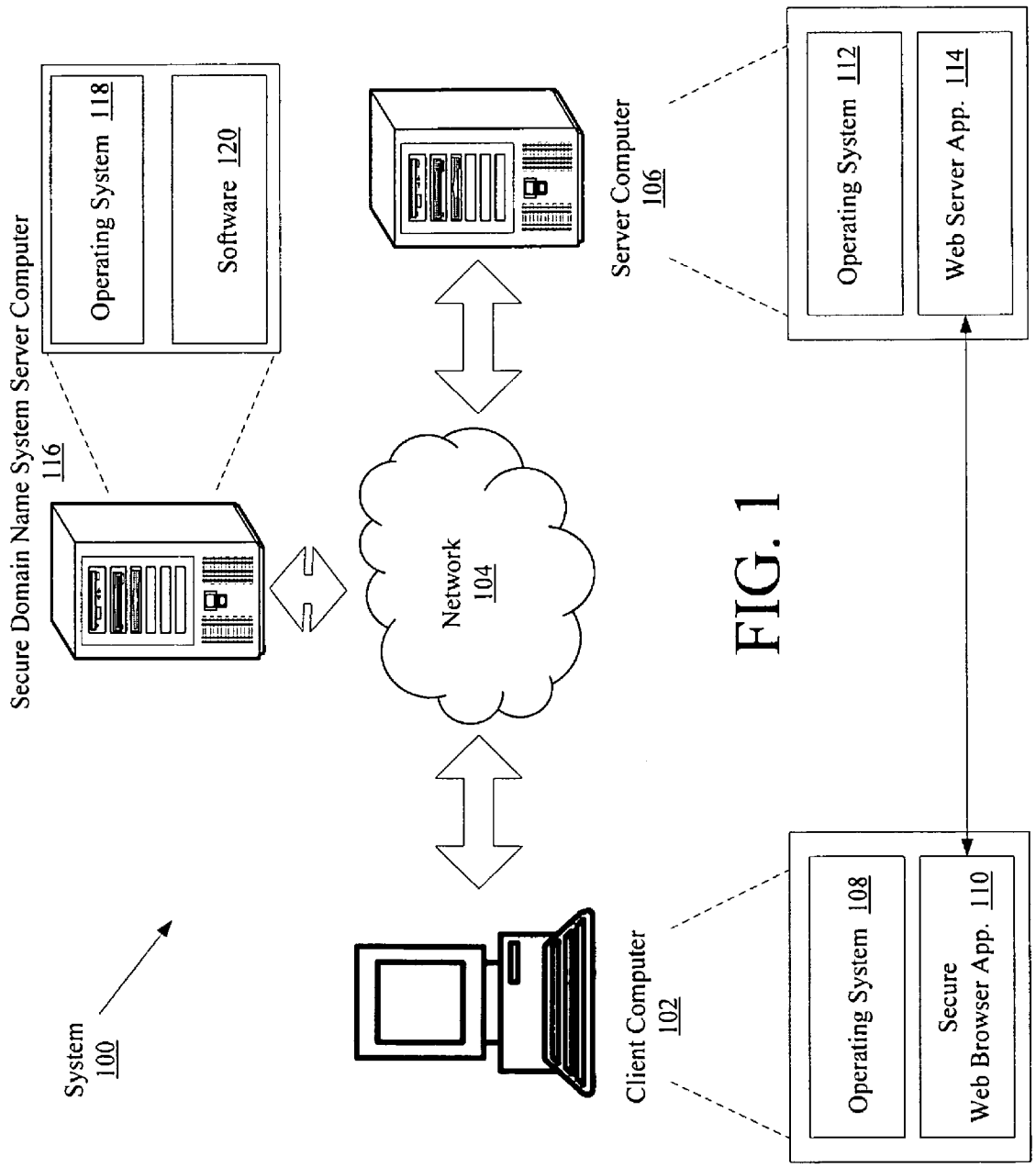
FIG. 1 is a schematic illustration of an exemplary system configured according to an embodiment of the present invention.

Referring now to FIG. 1, there is provided a schematic illustration of a system 100 for providing a Secure Desktop according to an embodiment of the present invention. As shown in FIG. 1, the system 100 comprises a client computer 102, a network 104, a server computer 106, and an optional secure Domain Name System (DNS) server 116. Each of the computers 102, 106 can operate as a single standalone device or can be connected (e.g., using the network 104) to other computing devices to perform various tasks in a distributed fashion. Each of the computers 102, 106, 116 can comprise various types of computing systems and devices, including a personal computer (PC), a tablet PC, a laptop computer, a desktop computer, or any other device capable of executing a set of instructions (sequential or otherwise) that specifies actions to be taken by that device. It is to be understood that a device of the present disclosure also includes any electronic device that provides voice, video or data communication. Further, while a single client computer 102 is illustrated in FIG. 1, the phrases "client computer" and "computer system" shall be understood to include any collection of computing devices that individually or jointly execute a set (or multiple sets) of instructions to perform any one or more of the methodologies discussed herein.

The computers 102, 106, 116 are communicatively coupled to one another through respective connections to the network 104. According to an embodiment of the present invention, the network 104 comprises an Internet. However, it should be appreciated that the network 104 can also comprise a Local Area Network (LAN), a Wide Area Network (WAN) or any other suitable network for connecting the computers 102, 106.

The computers 102, 106, 116 can be any multimode communication device capable of supporting wire line and/or wireless communication technologies. Such multimode communication devices include, but are not limited to, cell phones, personal computers, laptops, and personal digital assistants. In the case of wire line communications, the computers 102, 106, 116 can utilize xDSL, cable, or public switch telephone network (PSTN) telephony interfaces for communicating over the network 104, which can include hybrid technologies that support circuit-switched packet-switched communications. The computers 102, 106, 116 can also support accessory interfaces (e.g., universal serial buses, Firewires, and other connectivity technologies).

The computers 102, 106, 116 can further support any number of wireless communication protocols. Such communication protocols include, but are not limited to, 802.xx protocols defined by the Institute of Electrical and Electronics Engineers (IEEE). For instance, the computers 102, 106, 116 can utilize long-range wireless access technologies (e.g., cellular, software defined radio and WiMAX) and/or short-range wireless technologies to communicate with the network 104. Cellular access technologies include, but are not limited to, CDMA-1X, UMTS/HSDPA, GSM/GPRS, TDMA/EDGE, EV/DO, and next generation technologies as they emerge. Short-range wireless technologies include, but are not limited to, WiFi, Bluetooth, Zigbee, and cordless communications (e.g., digital enhanced cordless telecommunications).

A number of software components utilized by the computers 102, 106, 116 are shown in FIG. 1. In particular, the client computer 102 includes an operating system 108 for controlling the operation of a networked desktop or laptop computer. Similarly, the server computer 106 includes an operating system 112 for controlling the operation of a networked server computer. Likewise, the secure DNS server computer 116 includes an operating system 118 for controlling the operation of a networked DNS server computer and software 120 for performing secure DNS functions (which will be described in relation to FIG. 3). Operating systems are well known to those having ordinary skill in the art, and therefore will not be described herein. However, it should be understood that any operating system can be employed by the computers 102, 106, 116.

The client computer 102 also includes a secure web browser application 110 (also referred to herein as a "Secure Browser"). The Secure Browser 110 is generally operative to establish a connection with a web server application 114 executing on the server computer 106, request resources (e.g., web pages) from the server computer 106 through the connection, receive content (e.g., HTML content) from the server computer 106 through the connection, and execute the content (e.g., display a web page to a user of the client computer 102). The connection between the Secure Browser 110 and the web server application 114 can be established using the secure DNS functions provided by the secure DNS server computer 116 to resolve a domain name of the server computer 116 and translate it to a numerical identifier. As should be understood, a resource can require a user authentication. After a user (not shown) has been authenticated, a session is initiated. The user authentication typically involves obtaining confidential data from the user (not shown) of the client computer 102, communicating the confidential data (e.g., a user identification and/or a password) to the server computer 106, and verifying at the server computer 106 the user's identity using the confidential data. The Secure Browser 110 will be described in more detail below in relation to FIG. 3.

The secure DNS server computer 116 communicates with the client computer 102 via a secure connection (or a secure communication link) established therebetween. The secure connection can be, but is not limited to, a Secure Socket Layer (SSL) connection. SSL connections are well known to those having ordinary skill in the art, and therefore will not be described herein. The secure DNS server computer 116 can also receive encoded DNS requests from the client computer 102, decode the received encoded DNS requests, and process the decoded DNS requests for obtaining secure Internet Protocol (IP) addresses for network equipment of network sites (e.g., a network site (not shown) including the server computer 106). The secure DNS server computer 116 can further securely resolve Internet links and IP addresses. In this regard, the secure DNS server computer 116 provides a hierarchical naming system for computer, services, or any resource participating in a network. The hierarchical naming system associates various information with the domain name assigned to the server computer 106 and other similar server computers on the network. Accordingly, the secure DNS server computer 116 translated human meaningful domain names to numerical (e.g., binary) identifiers associated with networking equipment for purposes of locating and addressing the networking equipment.

Figure 2:
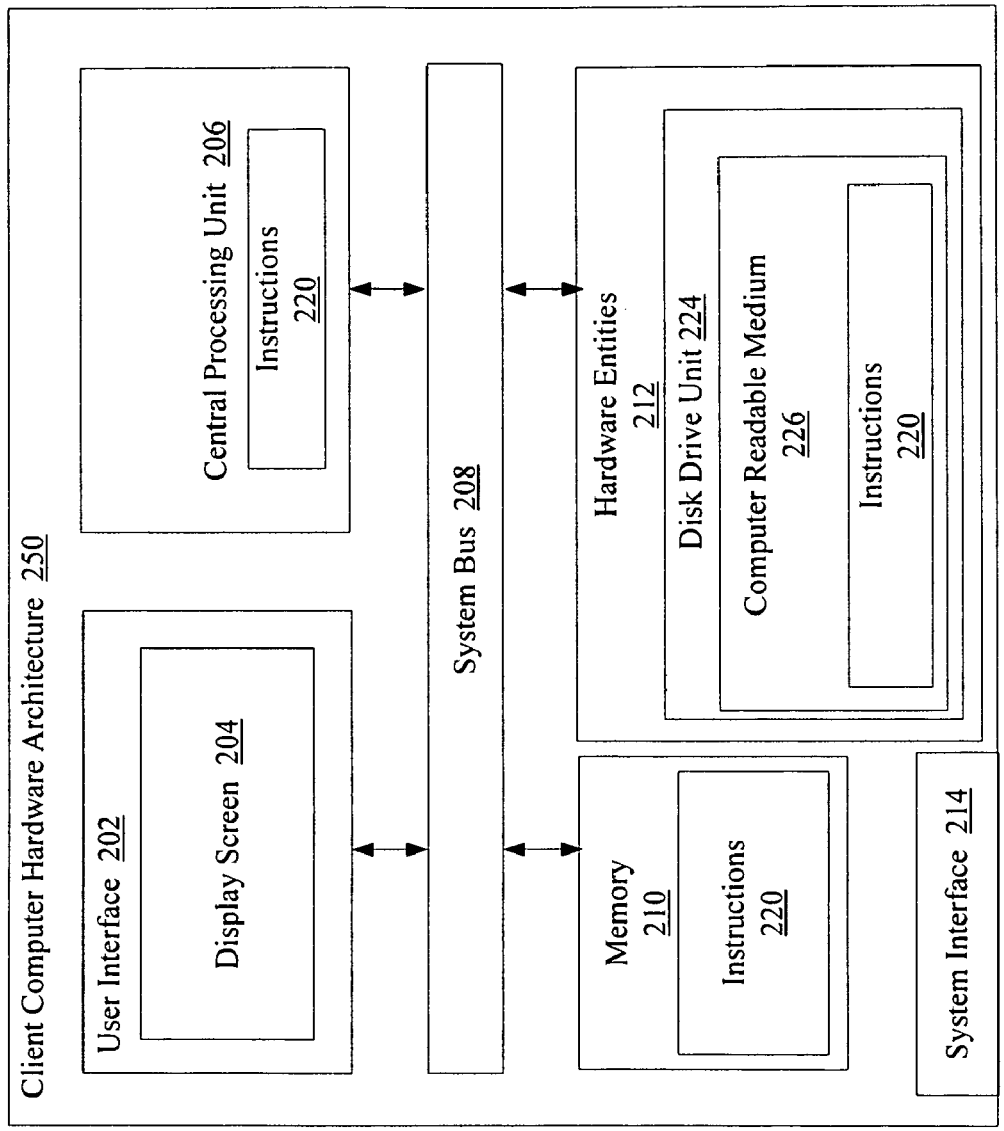
FIG. 2 is a block diagram of an exemplary hardware architecture for the client computer shown in FIG. 1.

Referring now to FIG. 2, there is provided a block diagram of an exemplary hardware architecture 250 for the client computer 102. As shown in FIG. 2, the hardware architecture 250 comprises a system interface 214, a user interface 202, a central processing unit 206, a system bus 208, a memory 210 connected to and accessible by other portions of client computer 102 through system bus 208, and hardware entities 212 connected to system bus 208. At least some of the hardware entities 212 perform actions involving access to and use of memory 210, which may be a random access memory (RAM), a disk driver, and/or a compact disc read only memory (CD-ROM).

User interface 202 is comprised of input devices, output devices, and software routines configured to allow a user to interact with and control software applications installed on the client computer 102. Such input and output devices include, but are not limited to, a display screen 204, a speaker (not shown), a keypad (not shown), a directional pad (not shown), a directional knob (not shown), and a microphone (not shown). As such, user interface 202 can facilitate a user-software interaction for launching web browser applications and other types of applications installed on the client computer 102.

System interface 214 allows the client computer 102 to communicate directly or indirectly with sever computer 106 (described above in relation to FIG. 1) and/or the secure DNS server computer 116. If the client computer 102 is communicating indirectly with the server computers 106 and/or 116, then the client computer 102 is sending and receiving communications through the common communications network 104.

Hardware entities 212 may include microprocessors, application specific integrated circuits (ASICs), and other hardware. Hardware entities 212 may include a microprocessor programmed for providing a Secure Desktop (e.g., a Secure Desktop 904 of FIG. 9). In this regard, it should be understood that the microprocessor can access and run a Trusted Secure Extensions (TSX) Core software program, a SDS software program, and/or TSX Client Applications installed on the client computer 102. Alternatively, the microprocessor can have the TSX Core software program, the SDS software program, and/or the TSX Client Applications installed thereon. The TSX Core software program, SDS software program, and/or TSX Client Applications will be described below in relation to FIG. 3. However, it should be noted that the SDS software program can include a VERO™ software program available from Authentium, Inc. of Palm Beach Gardens, Fla. Hardware entities 212 may further include a microprocessor programmed for simultaneously displaying Unsecure Desktops (e.g., the Unsecure Desktop 902 shown in FIG. 9) and Secure Desktops (e.g., a Secure Desktop 904 of FIG. 9) to a user via a display screen 204. Hardware entities 212 may include a decryption device (not shown) for decrypting all or a portion of the SDS software program prior to launching of the same.

As shown in FIG. 2, the hardware entities 212 can include a disk drive unit 224 comprising a computer-readable storage medium 226 on which is stored one or more sets of instructions 220 (e.g., software code) configured to implement one or more of the methodologies, procedures, or functions described herein. The instructions 220 can also reside, completely or at least partially, within the memory 210 and/or within the CPU 206 during execution thereof by the client computer 102. The memory 210 and the CPU 206 also can constitute machine-readable media.

While the computer-readable storage medium 226 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Figure 3:
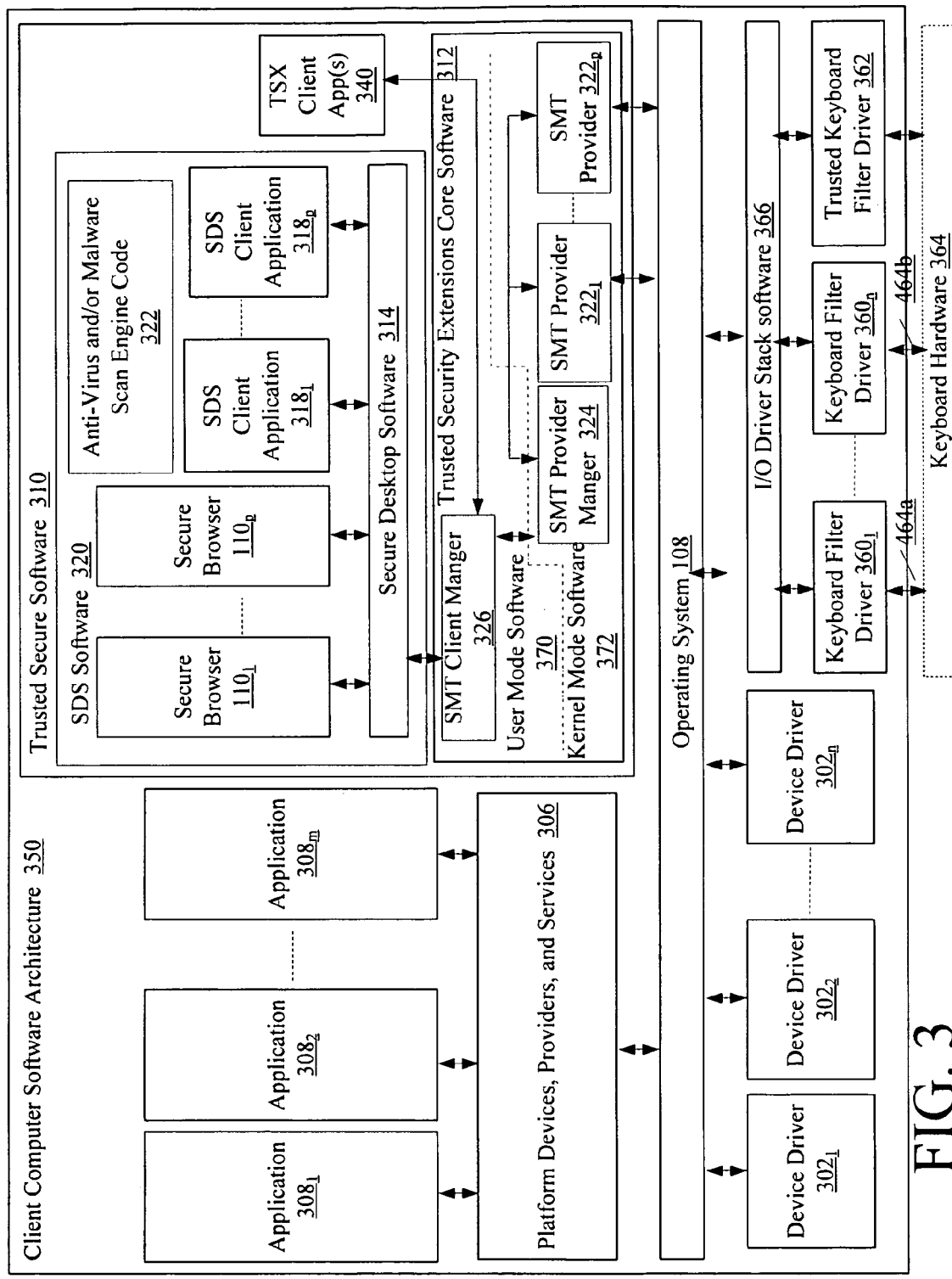
FIG. 3 is a schematic illustration of an exemplary software architecture for the client computer shown in FIG. 1.

Referring now to FIG. 3, there is provided an exemplary software architecture 350 for the client computer 102. As shown in FIG. 3, the software architecture 350 can include levels of software programs. The software architecture 350 includes device drivers $302_1, 302_2, \ldots, 302_n$, keyboard filter drivers $360_1, 360_2$ (not shown), $\ldots, 360_n$, a trusted keyboard filter driver 362, Input/Output (I/O) Driver Stack software 366, an operating system (OS) 108, platform device/provider/service (PDPS) software 306, software applications $308_1, 308_2, \ldots, 308_m$, and Trusted Secure software 310. The Trusted Secure software 310 can include a mechanism to inject the required functions to use secure DNS into each application. The software components $302_1, 302_2, \ldots, 302_n$, 306, 108, $360_1, 360_2$ (not shown), $\ldots, 360_n$ of software architecture 350 are well known to persons having ordinary skill in the art. Thus, the software components $302_1, 302_2, \ldots, 302_n$, 306, 108, $360_1, 360_2$ (not shown), $\ldots, 360_n$ will not be described in detail herein. However, a brief description of the software architecture 350 is provided to assist a reader in understanding the present invention.

A device driver $302_1, 302_2, \ldots, 302_n$ typically is software the OS 108 uses to facilitate communications between hardware components (e.g., hardware components 202, 206, 210, 212, 214 described above in relation to FIG. 2). A device driver $302_1, 302_2, \ldots, 302_n$ can include code for managing access to hardware components, setting hardware component parameters, and transmitting data between hardware components.

Each of the keyboard filter driver software programs $360_1, 360_2$ (not shown), $\ldots, 360_n$ is a particular type of device driver software program that the OS 108 uses to facilitate communications between keyboard hardware 364. Each of the keyboard filter driver software programs $360_1, 360_2$ (not shown), $\ldots, 360_n$ connects to the keyboard hardware 364 via a respective connection 464a, 464b. The Keyboard Filter Driver software programs $360_1, 360_2$ (not shown), $\ldots, 360_n$ communicate with the OS 108 via the I/O Driver Stack software 366. The I/O Driver Stack software 366 interfaces the OS 108, which passes key strokes to an Unsecured Desktop (e.g., the Unsecured Desktop 902 shown in FIG. 9) and applications $308_1, 308_2, \ldots, 308_m$ running on the Unsecured Desktop. As should be understood the Unsecured Desktop can be provided by Unsecured Desktop software (not shown in FIG. 3), which is well known to those having ordinary skill in the art, and therefore will not be described herein.

The Trusted Keyboard Filter Driver software program 362 provides an anti-key logging feature to the client computer 102. If the anti-key logging feature of the client computer 102 is active, then the connections 464a and 464b are temporarily broken between the Keyboard Filter Driver software programs $360_1, 360_2$ (not shown), $\ldots, 360_n$ and the keyboard hardware 364. In such a scenario, only the Keyboard Filter Driver software program 362 can communicate with the OS 108 via the I/O Driver Stack software 366. The Trusted Keyboard Filter Driver software program 362 can be a standard driver provided by a publisher of the OS 108, and thus can be verified against information published by the publisher of the OS 108.

OS 108 is system software responsible for the direct control and management of the client computer 102 hardware (e.g., hardware components 202, 206, 210, 212, 214 described above in relation to FIG. 2). Typically, OS 108 manages basic client computer system 102 operations, such as loading and running software applications. OS 108 is also system software responsible for enabling a user to control hardware coupled to the client computer system 102. OS 108 can also include instructions to install, launch, and manage applications. OS 108 is typically stored in memory (e.g., memory 210 described above in relation to FIG. 2) which may be a ROM, hard drive, or other storage device.

The PDPS software programs 306 can include a desktop configuration provider (not shown), a communications provider (not shown), and other providers/services known in the art. The desktop configuration provider (not shown) is software responsible for the direct control and management of desktop configurations. Desktop configurations are well known to those having ordinary skill in the art, and therefore will not be described herein. Software applications $308_1$, $308_2, \ldots, 308_m$ typically include programs designed for end users. Software applications $308_1, 308_2, \ldots, 308_m$ are typically installed on the client computer 102.

The Trusted Secure software 310 includes TSX Core software 312, SDS software 320, and TSX Client applications 340. The TSX Core software 312 includes user mode software 370 and kernel mode software 372. The TSX Core software 312 generally performs user event mode monitoring operations, kernel mode event monitoring operations, user mode event interception operations, and kernel mode event interception operations. The TSX Core software 312 includes System Monitor Toolkit (SMT) Client Manager software 326, SMT Provider Manager software 324, and SMT Provider software $322_1$, $322_2$ (not shown), $\ldots, 322_p$. The SMT Client Manager software 326 is executed in user mode. The SMT software 324, $322_1$, $322_2$ (not shown), $\ldots, 322_p$ is executed in kernel mode. The phrase "user mode", as used herein, refers to a state in which a process runs application code (e.g., end-user application code) rather than kernel code (e.g., device driver code and platform service code). The phrase "kernel mode", as used herein, refers to a state in which a process runs kernel code (e.g., device driver code, platform service code, and other kernel code that allows full access to the client computer 102 system).

The SMT Provider software $322_1$, $322_2$ (not shown), $\ldots, 322_p$ can generally be standalone software modules which execute in kernel mode while providing interception of specific kernel mode events. Each of the SMT Provider software $322_1$, $322_2$ (not shown), $\ldots, 322_p$ components respectively intercept kernel mode events that belong to the same or similar class. For example, the SMT Provider software $322_1$ is classified as File System SMT Provider software that can intercept Network Input/Output (I/O) requests. Embodiments of the present invention are not limited in this regard. The SMT Provider software $322_1$, $322_2$ (not shown), $\ldots, 322_p$ can include C Libraries of Binary Interception and Instrumentation (not shown) and C Run-Time Libraries (not shown). C Libraries of Binary Interception and Instrumentation (not shown) are well known to those having ordinary skill in the art, and therefore will not be described herein. Similarly, C Run-Time Libraries (not shown) are well known to those having ordinary skill in the art, and therefore will not be described herein.

The SMT Provider Manager software 324 is a driver or other software component that executes in kernel mode while performing registration operations for registration of the SMT Provider software $322_1$, $322_2$ (not shown), $\ldots, 322_p$ and un-registration operations for un-registration of the SMT Provider software $322_1$, $322_2$ (not shown), $\ldots, 322_p$. The SMT Provider Manager software 324 supplies the SMT Provider software $322_1$, $322_2$ (not shown), $\ldots, 322_p$ with a unified interface for intercepting kernel mode events, accessing a Common Information Model (CIM) library, accessing a CIM repository, delivering intercepted kernel mode events to the TSX Client applications 340, and receiving processed data about the intercepted kernel mode events from the TSX Client applications 340. The phrase "Common Information Model", as used herein, refers to an object oriented information model that provides a conceptual framework for describing management data, as specified by the Distributed Management Task Force, Inc.'s (DMTF) Common Information Model (CIM) Standard. The DMTF CIM Standard is well known to those having ordinary skill in the art, and therefore will not be described herein.

The SMT Client Manager software 326 is a service or other software component that executes in user mode while managing various TSX Client applications 340. The SMT Client Manager software 326 communicates with the TSX Client applications 340 via predefined protocols, such as Local Procedure Calls (LPCs) or Transmission Control Protocols/Internet (TCP/IP) protocols. PLCs and TCP/IP protocols are well known to those having ordinary skill in the art, and therefore will not be described herein.

One or more of the TSX Client applications 340 can simultaneously and/or concurrently execute in user mode. The TSX Client applications 340 use information provided by the OS 108 in real-time while having the ability to employ a wide range of functionality. The wide range of functionality include, but are not limited to, monitoring File I/O kernel mode requests, granting File I/O kernel mode requests, denying File I/O kernel mode requests, and accessing registries. The TSX Client applications 340 can operate in Secure Desktop environment provided by the SDS software 320.

If the OS 108 is a Windows operating system, then the TSX Client applications 340 can be standard WIN32 or WIN64 applications. WIN32 and WIN64 applications are well known to those having ordinary skill in the art, and therefore will not be described herein. The TSX Client applications 340 can directly interface the TSX Core software 312 using a TSX Application Programming Interface (API). APIs are well known to those having ordinary skill in the art, and therefore will not be described herein. The TSX Client applications 340 can provide additional functionalities to the end-user independently from the Secure Desktop software 314. The additional functionalities can include, but are not limited to, non-security software features (e.g., data input functions, spreadsheet functions, or word processor functions). The phrase "end-user", as used herein, refers to a person or persons using a device the enables him or them to use the present invention. The TSX Client applications 340 can be validated against a required digital signature before being allowed to interface with the TSX Core software 312.

The SDS software 320 provides a Secure Desktop environment for one more SDS Client applications $318_1$, $318_2$ (not shown), $\ldots, 318_p$ and/or TSX Client applications 340 installed on the client computer 102. The SDS software 320 includes Secure Desktop software 314 and Secure Browser software $110_1, 110_2$ (not shown), $\ldots, 110_p$ that can execute on the client computer 102. The Secure Desktop software 314 can communicate with the TSX Core software 312 via an Application Programming Interface (API) using predefined protocols. The predefined protocols can include, but are not limited to, LPCs and TCP/IP protocols.

The Secure Desktop software 314 provides security services to the SDS Client applications $318_1$, $318_2$ (not shown), $\ldots, 318_p$ and the Secure Browser software $110_1$, $110_2$ (not shown), $\ldots, 110_p$. The security services include, but are not limited to, an ability to protect a range of registry keys and files from being modified and/or deleted, an ability to prevent code injection into a running SDS Client application $318_1, 318_2, \ldots, 318_p$ and/or running Secure Browser software $110_1$, $110_2$ (not shown), $\ldots, 110_p$, an ability to prevent a termination of a running process, an ability to protect against keyloggers, an ability to protect against screen scrapers, and an ability to protect against other malware. The term "keylogger", as used herein, refers to a special type of malware that attempts to capture private data from a user of a computer system by capturing key stokes and mouse clicks from a user interface (e.g., user interface 202 of FIG. 2) of the computer system (e.g., the client computer 102 of FIGS. 1 and 2). The phrase "screen scraper", as used herein, refers to a special type of malware that attempts to capture private data from a user of a computer system by capturing information as it is displayed on a display screen (e.g., the display screen 204 of FIG. 2) of the computer system (e.g., the client computer 102 of FIGS. 1 and 2). The term "malware", as used herein, refers to software executing on a computer system that performs operations solely to the benefit of an unauthorized party or otherwise harmful to the computer system.

The Secure Browser software $110_1$, $110_2$ (not shown), ..., $110_p$ is a special form of a SDS Client application that is further protected against tampering by means of encryption. In this regard, it should be understood that the Secure Browser software $110_1$, $110_2$ (not shown), ..., $110_p$ is stored in an encrypted format within a memory (e.g., the memory 210 of FIG. 2) of the client computer 102. In such a scenario, the Secure Browser software $110_1$, $110_2$ (not shown), ..., $110_p$ is decrypted each time the SDS software 320 is launched. The encryption and decryption of the Secure Browser software $110_1$, $110_2$ (not shown), ..., $110_p$ ensures that the Secure Browser software $110_1$, $110_2$ (not shown), ..., $110_p$ cannot be tampered with when the SDS software 320 is inactive. The Secure Browser software $110_1$, $110_2$ (not shown), ..., $110_p$ can connect to one or more server computers (e.g., the server computer 106 of FIG. 1) via a network (e.g., the network 104 of FIG. 1). The Secure Browser software $110_1$, $110_2$ (not shown), ..., $110_p$ can be disabled or terminated via user actions. Subsequent to being disabled, the Secure Browser software $110_1$, $110_2$ (not shown), ..., $110_p$ and associated files are deleted.

Notably, the Secure Browser software $110_1$, $110_2$ (not shown), ..., $110_p$ is fully protected against tampering by hackers with access to the client computer 102 and malware operating on the client computer 102. In effect, the Secure Browser software $110_1$, $110_2$ (not shown), ..., $110_p$ is uniquely positioned to perform operations on data accessed over the network (e.g., the network 104 of FIG. 1) or on the client computer 102.

The SDS Client applications $318_1$, $318_2$ (not shown), ..., $318_p$ execute in user mode. At least a first one of the SDS Client applications $318_1$, $318_2$ (not shown), ..., $318_p$ can be a standard WIN32 application or a standard WIN64 application. WIN32 and WIN64 applications are well known to those having ordinary skill in the art, and therefore will not be described herein. The SDS Client application $318_1$, $318_2$ (not shown), ..., $318_p$ can be launched on a Secure Desktop (e.g., the Secure Desktop 904 shown in FIG. 9) after the SDS Client applications $318_1$, $318_2$ (not shown), ..., $318_p$ have been deemed trusted applications. The phrase "trusted application", as used herein, refers to an application that is an untampered, well known application.

At least a second one of the SDS Client applications $318_1$, $318_2$ (not shown), ..., $318_p$ can provide the Secure Desktop environment from which other applications and programs can be launched while being fully protected against tampering and monitoring by malware. This malware protection is facilitated by registry key protection, kernel mode level file protection, code injection protection, and screen scraper protection. The registry key protection and kernel mode level file protection will be described in detail below in relation to FIG. 6. The code injection protection will be described in detail below in relation to FIG. 7. The screen scraper protection will be described in detail below in relation to FIG. 8.

The SDS Client applications $318_1$, $318_2$, ..., $318_p$ simultaneously and concurrently execute in user mode. If the SDS Client applications $318_1$, $318_2$, ..., $318_p$ employ security measures (e.g., security measures of granting or denying File I/O kernel mode requests related to the SDS Client applications $318_1$, $318_2$, ..., $318_p$), then malware trying to compromise (i.e., gather or manipulate) data used by the SDS Client applications $318_1$, $318_2$, ..., $318_p$ is locked out. In effect, the overall security of the client computer 102 is increased as compared to conventional client computer systems.

The SDS Client applications $318_1$, $318_2$, ..., $318_p$ simultaneously use monitoring, interception, and redirection of operating system events to provide application security functions. The application security functions can include, but are not limited to, anti spyware functions, anti virus functions, on-the-fly data encryption functions, firewall functions, network related functions, file software related functions, and registry related software functions. Notably, the monitoring, interception, and redirection of operating system events is enabled by the TSX Core software 312.

The SDS software 320 can scan hardware (e.g., memory) and running software for viruses and malware using an Anti-Virus and/or Malware Scan Engine code 322. In such a scenario, the SDS software 320 can take appropriate actions to ensure that any detected malware is neutralized prior to starting the Secure Desktop software 314.

According to embodiments of the present invention, the SDS software 320, TSX Core software 312, and TSX Client applications 340 are installed on the client computer 102, uninstalled from the client computer 102, activated, and/or disabled via user actions. The SDS software 320 can be validated against a trusted license upon activation. Once activated, no other applications are permitted to start. However, running applications are allowed to continue to execute provided that the running applications have been deemed to be non-malicious software. The SDS software 320 and the TSX Core software 312 collectively provide the client computer 102 with persistent security features. The phrase "persistent security features", as used herein, means that one or more security features remain active between restarting of the OS 108. For example, if the OS 108 starts the TSX Core software 312 during a boot process, then a number of security features as pre-defined through policies during a previous session of a Secure Desktop or a secure application will be in place prior to any new session of the SDS software 320 and/or selected applications. In effect, the persistent security features prevent tampering with critical components of the SDS software 320 and selected applications when the SDS software 320 is not active. Embodiments of the present invention are not limited in this regard.

In view of the forgoing, it should be emphasized that the TSX Client applications 340, the Secure Desktop software 314, and the SDS Client applications $318_1$, $318_2$ (not shown), ..., $318_p$ communicate with the TSX Core software 312 using an inter process communications based on pre-defined protocols (e.g., LPCs and TCP/IP protocols). In effect, the SDS software 320 controls actions taken by the OS 108 when certain kernel mode events occur. For example, access to certain registry keys or files may be blocked on behalf of the SDS Client applications $318_1$, $318_2$ (not shown), ..., $318_p$ or the TSX Client applications 340.

Notably, the system 100 of FIG. 1 implements a method 400 for providing a Secure Desktop (e.g., the Secure Desktop 904 shown in FIG. 9) to a client computer (e.g., the client computer 102 of FIG. 1). The following FIGS. 4A-4D and accompanying text illustrate such a method 400 for providing a Secure Desktop (e.g., the Secure Desktop 904 shown in FIG. 9). It should be appreciated, however, that the method disclosed herein is provided for purposes of illustration only and that embodiments of the present invention are not limited solely to the method shown.

Figure 4A:
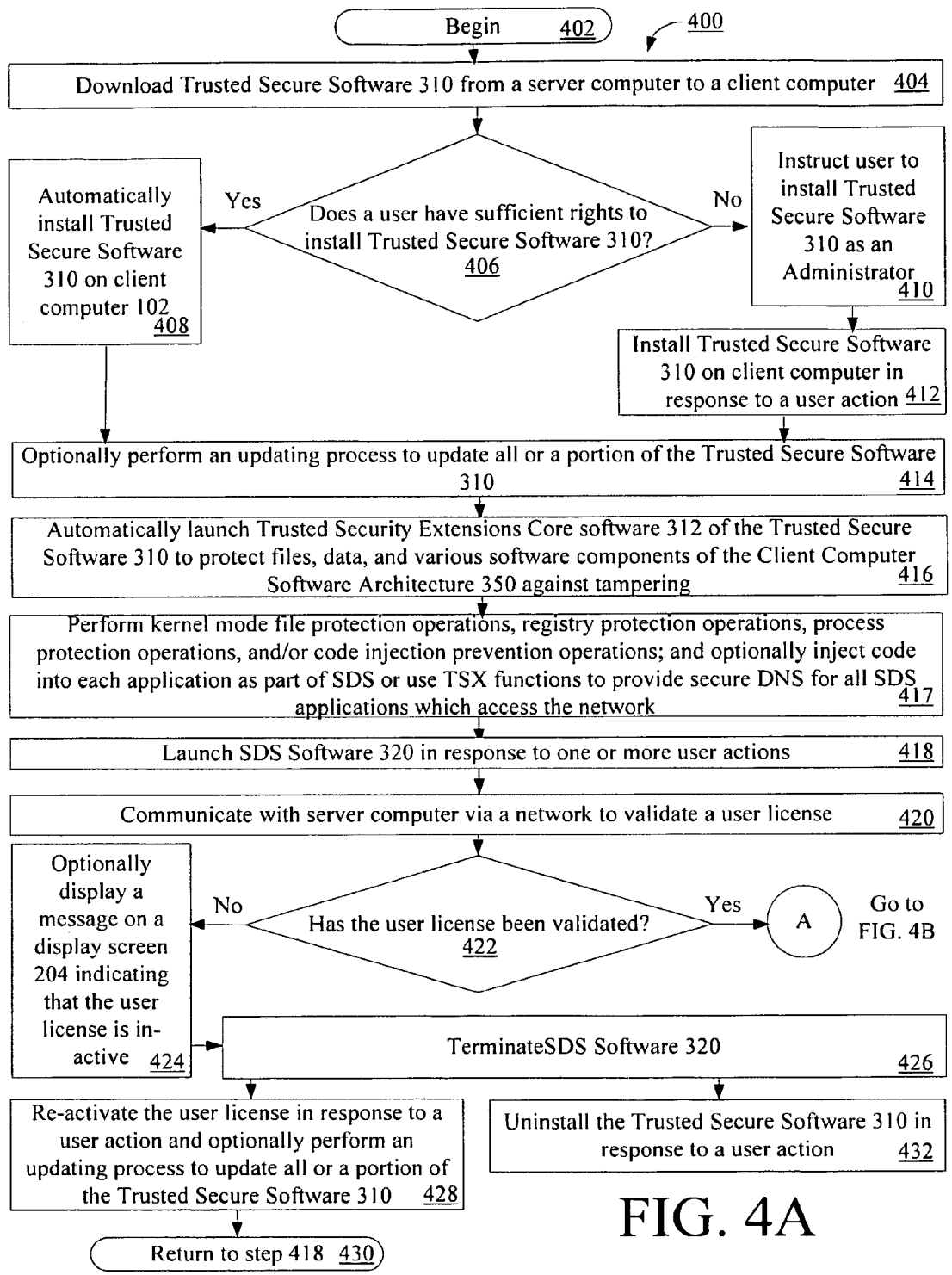
FIGS. 4A-4D collectively provide a flow diagram of an exemplary method for providing a Secure Desktop according to an embodiment of the present invention.

Referring now to FIG. 4A, the method 400 begins with step 402 and continues to step 404. In step 404, Trusted Secure Software 310 is downloaded from a server computer (e.g., the server computer 106 of FIG. 1) to a client computer (e.g., the client computer 102 of FIG. 1). The term "download", as used herein, refers a process to transfer files from a first computer to a second computer via a network. Accordingly, the server computer includes a responding part (not shown in FIG. 1 for purposes of simplicity) for when receiving a security software download request from the client computer obtaining files for the security software and communicating the files to the client computer. Thereafter, a decision step 406 is performed where it is determined if a user of the client computer has sufficient rights to install the Trusted Secure Software 310. If the user is determined to have sufficient rights to install the Trusted Secure Software 310 [406:YES], then step 408 is performed where the Trusted Secure Software 310 is automatically installed on the client computer. Subsequently, the method 400 continues with an optional step 414, which will be described below.

If the user is determined not to have sufficient rights to install the Trusted Secure Software 310 [406:NO], then steps 410 and 412 are performed. Step 410 involves instructing the user of the client computer to install the Trusted Secure Software 310 as an Administrator. Step 412 involves installing the Trusted Secure Software 310 on the client computer in response to one or more user actions. The user actions can include, but are not limited to, entering a user name, entering a password, and clicking a software installation button. After installing the Trusted Secure Software 310, an optional step 414 is performed.

In optional step 414, an updating process is performed to update all or a portion of the Trusted Secure Software 310. Next, the TSX Core software 312 of the Trusted Secure Software 310 is automatically launched in step 416. As noted above, the TSX Core software 312 protects data files, data, and various software components of a client computer software architecture (e.g., the software architecture 350 of FIG. 3) against tampering. This tampering protection is facilitated by the performance of kernel mode file protection operations, registry protection operations, process protection operations, and/or code injection prevention operations which begin functioning in step 417. The registry and file protection operations can include, but are not limited to, monitoring user-mode events, determining if the user-mode events are Registry or File System events, and allowing/blocking the Registry or File System events based on a predefined policy. The code injection prevention operations can include, but are not limited to, monitoring functions used to inset code into software components (e.g., the software components $302_1$, $302_2$, ..., $302_n$, 108, 306, $308_1$, $308_2$, ..., $308_m$, $360_1$, $360_2$ (not shown), ..., $360_n$, 362, 366, and/or 310 of FIG. 3) of a software architecture (e.g., the client computer software architecture 350 of FIG. 3), intercepting these functions, and preventing these functions from succeeding if they are determined to be used by malware or an application running in an Unsecured Desktop (e.g., the Unsecured Desktop 902 shown in FIG. 9). Step 417 can also involve optionally injecting code into each application as part of SDS or use TSX functions to provide secure DNS for all SDS applications which access the network (or Internet).

Upon completing step 417, the method 400 continues with step 418. Step 418 involves launching the SDS software 320 in response to one or more user actions. The user actions can include, but are not limited to, moving a mouse until a mouse cursor is on top of a SDS software icon (not shown) displayed on an Unsecured Desktop (e.g., the Unsecured Desktop 902 shown in FIG. 9) and clicking a right button of the mouse. In response to launching the SDS software 320, step 420 is performed where the client computer communicates with a server computer (e.g., the server computer 106 of FIG. 1) via a network (e.g., the network 104 of FIG. 1) to validate a user license. The user license can be validated using a mechanism that uniquely identifies the client computer. This mechanism can employ a unique key generated at the client computer. Such a unique key mechanism can facilitate the tailoring of configurations and updates to the client computer.

If the user license has not been validated [422:NO], then the method 400 continues with an optional step 424. Optional step 424 involves displaying a message on a display screen (e.g., the display screen 204 of FIG. 2) indicating that the user license is inactive. The SDS software 320 is also terminated in step 426. Subsequently, step 428 or step 432 is performed. In step 432, the Trusted Secure Software 310 is uninstalled in response to one or more user actions. In step 428, the user license is reactivated in response to one or more user actions. Also, an optional updating process is performed to update all or a portion of the Trusted Secure Software 310. After reactivating the user license and/or performing the optional updating process, step 430 is performed where the method returns to step 418 and/or subsequent processing is resumed.

Figure 4B:
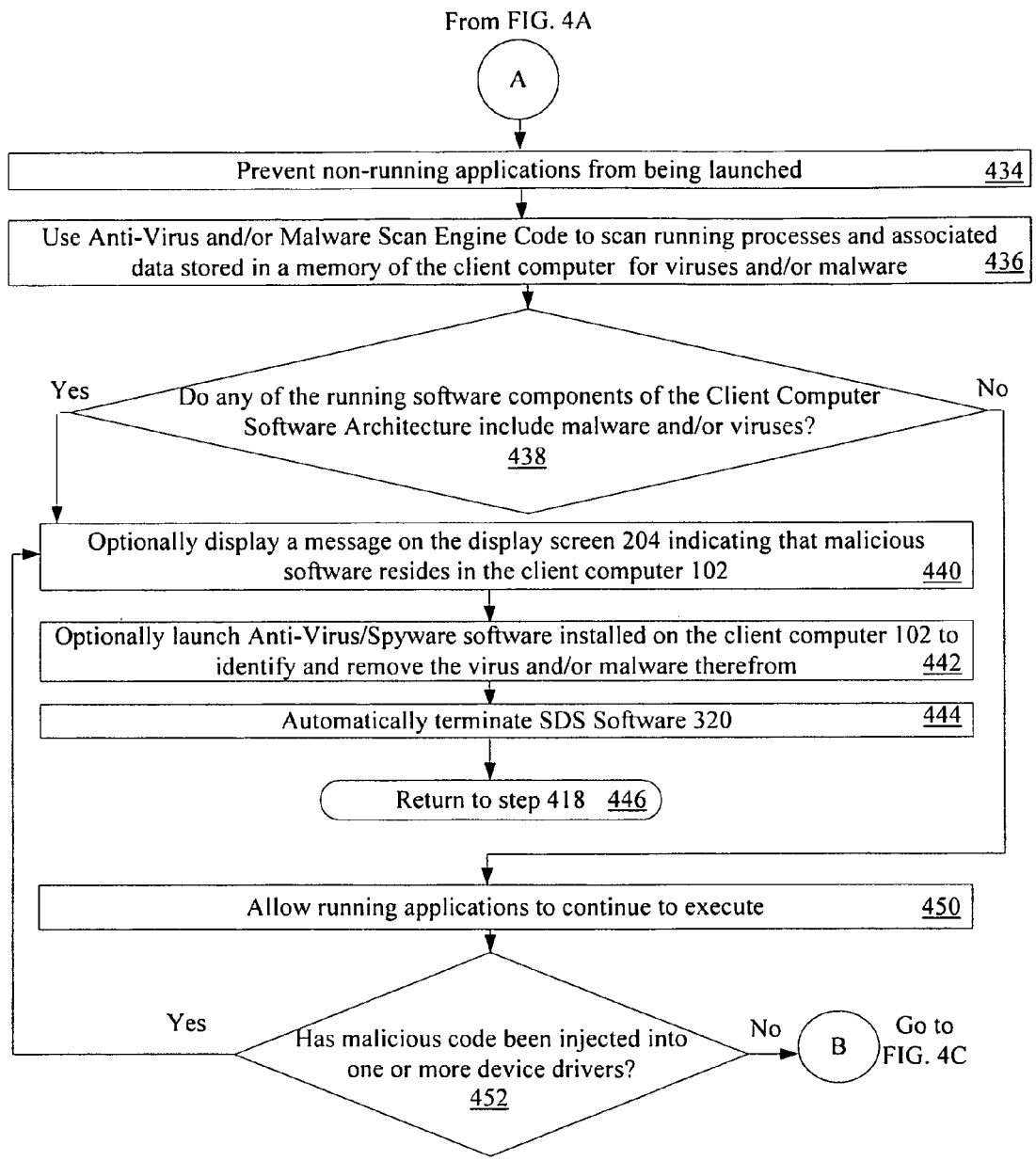

If the user license has been validated [422:YES], then the method 400 continues with step 434 of FIG. 4B. Step 434 involves preventing non-running applications (e.g., applications $308_1$, $308_2$, ..., $308_p$ of FIG. 3) from thereafter being launched during the remaining period during which the SDS software continues to execute. In the next step 436, an Anti-Virus and/or Malware Scan Engine code (e.g., the Anti-Virus and/or Malware Scan Engine code 322 of FIG. 3) is utilized to scan running processes and associated data for viruses and/or malware. The data associated with running processes can be stored in a memory (e.g., the memory 210 of FIG. 2) of the client computer. If any of the running software components includes malware and/or a virus [438:YES], then steps 440-446 are performed. Step 440 involves optionally displaying a message on a display screen (e.g., the display screen 204 of FIG. 2) of the client computer indicating that malicious software resides in the client computer. In step 442, an Anti-Virus/Spyware software installed on the client computer is optionally launched. The Anti-Virus/Spyware software can indentify and/or facilitate the removal of malware and/or virus from the client computer. The Anti-Virus/Spyware software can include, but is not limited to, NORTON ANTIVIRUS™ software available from Symantec Corporation of Cupertino, Calif. Thereafter, step 444 is performed where the SDS software 320 is automatically terminated. In step 446, the method 400 returns to step 418 or subsequent processing is resumed. It should be noted that steps 436-446 advantageously provide a client computer 102 in which malware can be identified and neutralized prior to launching the Secure Desktop software 314, Secure Browsers $110_1$, $110_2$, ..., $110_p$, and/or the SDS Client applications $318_1$, $318_2$, ..., $318_p$.

If any of the running software components does not include malware and/or a virus [438:NO], then the method 400 continues with step 450 where the running applications are allowed to continue to execute. Subsequent to completing step 450, a decision step 452 is performed. If malicious code has been injected into one or more device drivers (e.g., the device drivers $302_1$, $302_2$, ..., $302_n$, $360_1$, $360_2$, ..., $360_n$, and/or 362 of FIG. 3), then steps 440-446 are performed. As noted above, the method 400 returns to step 418 or subsequent processing is resumed in step 446. In effect, a keyboard and mouse security feature has been provided to the client computer. For example, if a driver for a keyboard and/or a mouse includes malicious code injected therein by malware, then the SDS software 320 is prevented from running until the malicious code is removed therefrom.

Figure 4C:
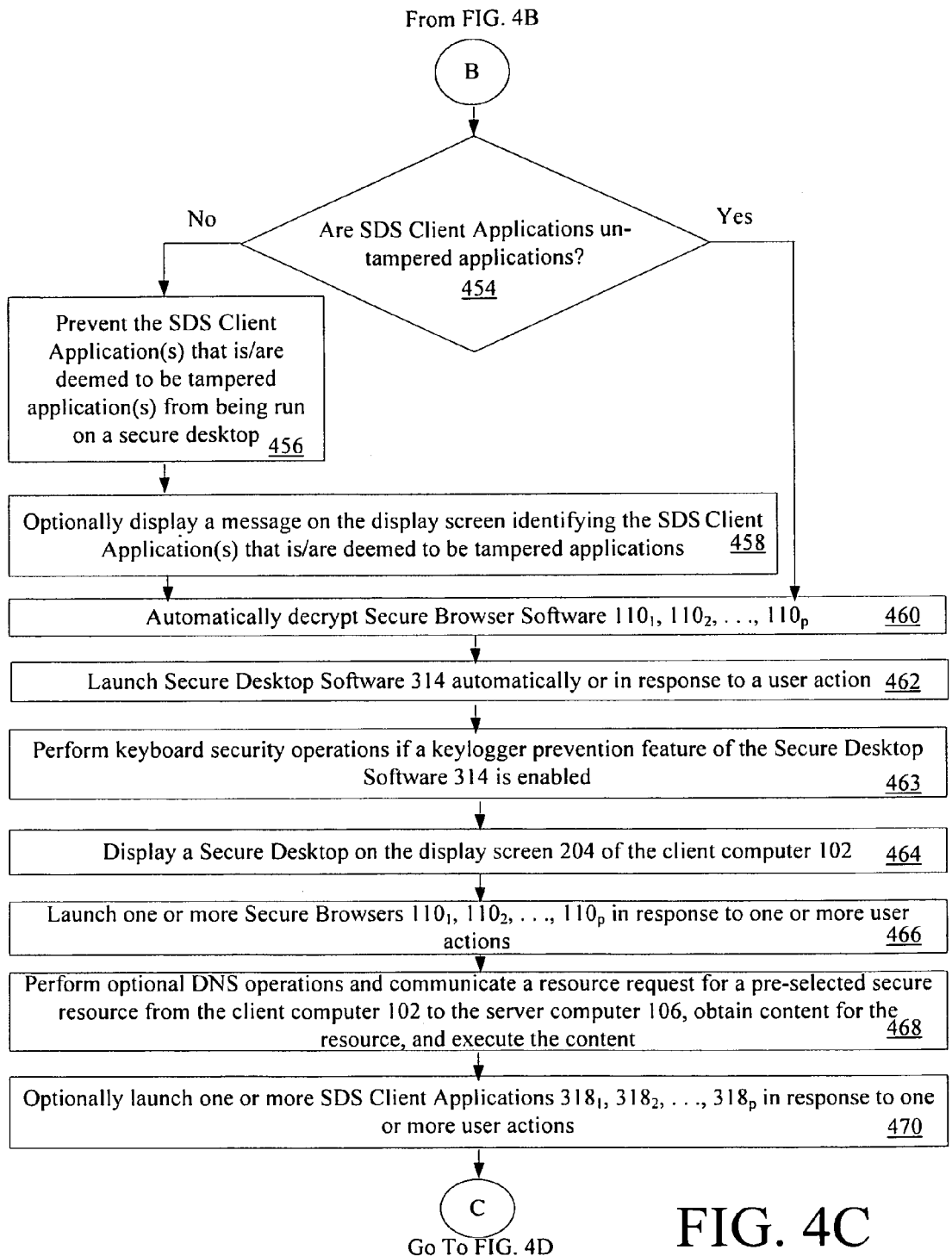
Figure 4D:
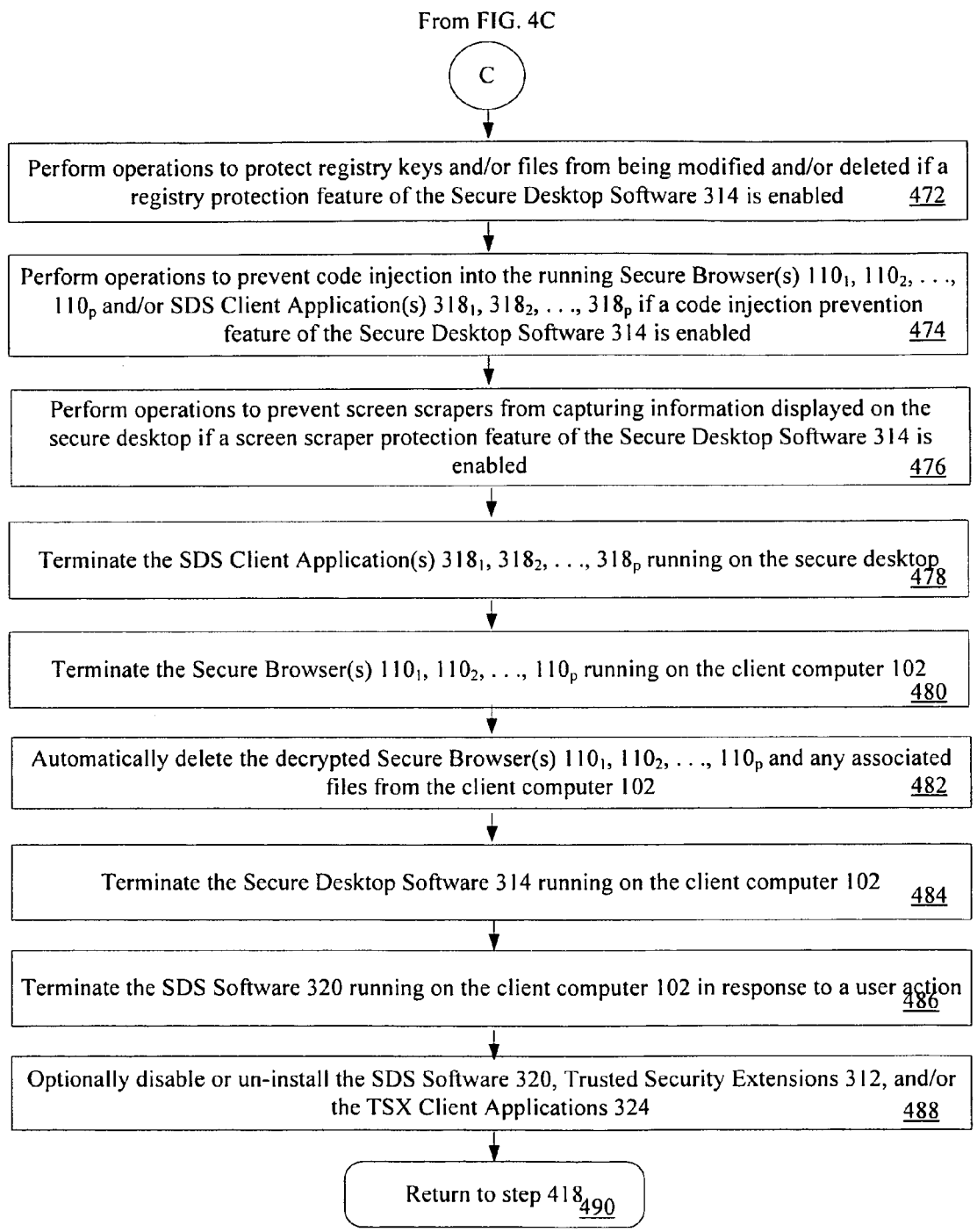

If malicious code has not been injected into one or more device drivers (e.g., the device drivers $302_1$, $302_2$, ..., $302_n$, $360_1$, $360_2$, ..., $360_n$, and/or 362 of FIG. 3), then the method 400 continues with a decision step 454 of FIG. 4C where it is determined whether the SDS Client applications (e.g., the SDS Client applications $318_1$, $318_2$, ..., $318_n$ of FIG. 3) are tampered or un-tampered applications. This determination is made by verifying that a digital signature of a file is intact and valid. The digital signature can be, but is not limited to, a Verisign level 3 digital signature which is well known to those having ordinary skill in the art. This determination is also made by comparing memory images of the SDS Client applications installed on the client computer 102 against disk images of the SDS Client applications on the client computer 102.

If the SDS Client applications (e.g., the SDS Client applications $318_1$, $318_2$, ..., $318_n$ of FIG. 3) are un-tampered applications or tampering is being blocked by TSX Core software installed on the client computer 102 [454:YES], then the method 400 continues with step 460 (which will be described below). If the SDS Client applications are not un-tampered applications [454:NO], then steps 456 and 458 are performed. In step 456, the tampered SDS Client applications are prevented from being run on a Secure Desktop (e.g., the Secure Desktop 904 shown in FIG. 9). Step 458 involves optionally displaying a message on a display screen (e.g., the display screen 204 of FIG. 2) of the client computer indentifying the SDS Client application(s) that is(are) tampered applications. Next, step 460 is performed where Secure Browser software (e.g., the Secure Browser software $110_1$, $110_2$ (not shown), ..., $110_p$ of FIG. 3) components of the SDS software is automatically decrypted.

Upon completing the decryption of the Secure Browser software, it is launched in step 462. The Secure Browser software can be launched automatically or in response to one or more user actions. In response to launching the Secure Browser software, steps 463 and 464 are performed. In step 463, keyboard security operations are performed if a keylogger prevention feature of the Secure Desktop software is enabled. The keyboard security operations will be described below in relation to FIG. 5. Step 464 involves displaying a Secure Desktop on the display screen of the client computer. A schematic illustration of an exemplary Secure Desktop 904 displayed on a display screen 204 is provided in FIG. 9.

Figure 9:
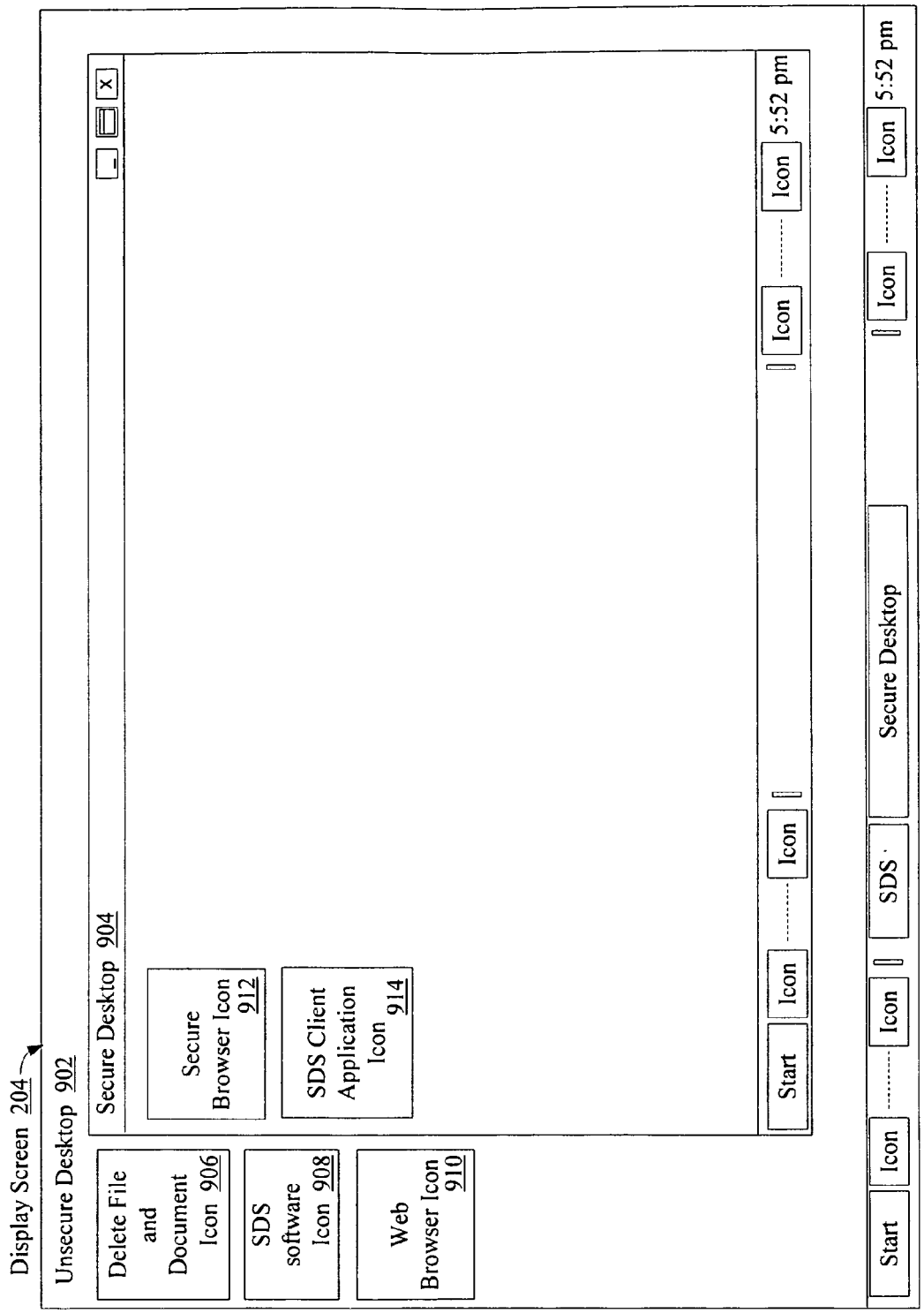
FIG. 9 is a schematic illustration of the display screen of FIG. 2 having an Unsecured Desktop and a Secured Desktop displayed thereon.

As shown in FIG. 9, the Secure Desktop 904 is displayed on top of an Unsecure Desktop 902. The Secure Desktop 904 is configured to simultaneously run with the Unsecure Desktop 902. The Secure Desktop 904 provides a desktop environment in which end-user actions are performed while an underlying security software (e.g., the TSX Core software 312 of FIG. 3) protects all local software (e.g., the Secure Browsers $110_1$, $110_2$, ..., $110_p$ and SDS Client applications $318_1$, $318_2$, ..., $318_p$ of FIG. 3). The Secure Desktop 904 includes at least one icon 912 for launching a Secure Browser and at least one icon 914 for launching a SDS Client application. The term "icon", as used herein, means a small pictogram which represents a file, folder, application or device on a computer operating system. The Secure Desktop 904 can also include a taskbar at the bottom thereof. The term "taskbar", as used herein, means an application desktop bar which is to launch and monitor applications running on the desktop. The Unsecure Desktop 902 provides a desktop environment for an operating system (e.g. MICROSOFT WINDOWS™ and Mac OS X) in which applications can be launched and files can be open. Accordingly, the Unsecure Desktop 902 includes at least one icon 906 for deleting files and/or documents, at least one icon 908 for launching SDS software, and at least one icon 910 for launching an Unsecure Web Browser. Embodiments of the present invention are not limited in this regard. For example, the Unsecure Desktop 902 and Secure Desktop 904 can include any number of icons selected in accordance with a particular computer application.

Referring again to FIG. 4C, the method 400 continues with step 466 where one or more Secure Browsers $110_1$, $110_2$ (not shown in FIG. 3), ..., $110_p$ are launched in response to one or more user actions. The user actions can include, but are not limited to, moving a mouse (not shown) until a mouse cursor (not shown) resides on top of an icon and clicking a button of the mouse (not shown). Subsequent to launching the Secure Browser(s) $110_1$, $110_2$ (not shown in FIG. 3), ..., $110_p$, step 468 is performed where optional DNS operations are perform. The optional DNS operations generally involve communicating a DNS resolution request for obtaining an IP address for a network site from a client computer (e.g., the client computer 102 of FIG. 1) to a secure DNS server computer (e.g., the secure DNS server computer 116 of FIG. 1). In response to receiving the DNS resolution request, the secure DNS server computer translates the domain name of the network site into an IP address and communicates the IP address to the client computer. The IP address can be encrypted prior to communication from the secure DNS server computer to the client computer. In such a scenario, the client computer can decrypt the IP address after receipt of the same from the secure DNS server computer.

Step 468 can also involve communicating a resource request for a pre-selected secure resource from the client computer to the server computer. The pre-selected secure resource can be, but is not limited to, a webpage for a website hosted by a particular entity (e.g., an online banking organization, an online stock trading organization, and/or an online social data exchange organization). Step 468 can also involve obtaining content for the pre-selected secure resource and executing the content so as to display the content to the user of the client computer. Thereafter, step 470 can be performed where one or more SDS Client applications $318_1$, $318_2$ (not shown in FIG. 3), ..., $318_p$ are optionally launched in response to one or more user actions.

Next, the method 400 continues with a plurality of malware protection operations. These malware protection operations are performed in steps 472-476 of FIG. 4D if respective protection features of the Secure Desktop software 314 are enabled. For example, operations are performed in step 472 by the client computer to protect registry keys and/or files from being modified and/or deleted if a registry key protection feature of the Secure Desktop software 314 is enabled. The registry key and/or file protection operations will be described below in relation to FIG. 6. In step 474, operations are performed by the client computer to prevent code injection into the running Secure Browser(s) $110_1$, $110_2$ (not shown in FIG. 3), ..., $110_p$ and/or SDS Client applications $318_1$, $318_2$ (not shown in FIG. 3), ..., $318_p$ if a code injection prevention feature of the Secure Desktop software 314 is enabled. The code injection prevention operations will be described below in relation to FIG. 7. Operations are also performed in step 474 by the TSX Core software 312 on the client computer 102 to prevent manipulation of running Secure Browser or Secure Desktop processes (e.g., process termination actions or other actions affecting the normal operation of the Secure Browser or Secure Desktop processes on the client computer). In step 476, operations are performed by the client computer to prevent screen scrapers from capturing information displayed on the Secure Desktop if a screen scraper protection feature of the Secure Desktop software 314 is enabled. The screen scraper prevention operations will be described below in relation to FIG. 8.

Once the user is finished performing operations in the Secure Desktop environment, steps 478-490 are performed. In step 478, the SDS Client applications $318_1$, $318_2$ (not shown in FIG. 3), . . . , $318_p$ running on the Secure Desktop are terminated. The SDS Client applications $318_1$, $318_2$ (not shown in FIG. 3), . . . , $318_p$ can be terminated in response to one or more user actions. Similarly, the Secure Browser(s) $110_1$, $110_2$ (not shown in FIG. 3), . . . , $110_p$ are terminated in step 480. The Secure Browser(s) $110_1$, $110_2$ (not shown in FIG. 3), . . . , $110_p$ can be terminated in response to one or more user actions. After terminating the Secure Browser(s) $110_1$, $110_2$ (not shown in FIG. 3), . . . , $110_p$, step 482 is performed where the decrypted software and/or files associated with the Secure Browser(s) $110_1$, $110_2$ (not shown in FIG. 3), . . . , $110_p$ are automatically deleted from the client computer. In steps 484 and 486, the Secure Desktop software 314 and the SDS software 320 running on the client computer are terminated. The software 314, 320 can be terminated in response to a user action. Thereafter, the SDS software 320, TSX Core software 312, and TSX Client applications 340 can be optionally disabled or un-installed in step 488. In step 490, the method 400 returns to step 418 of FIG. 4A or subsequent processing is performed.

In view of the forgoing, it should be noted that the TSX Core software 312 is active even when the SDS software 320 is not being used by the user of the client computer. In effect, the client computer is ensured maximum security against malware. Certain security functions (e.g., keylogger protection functions) of the TSX Core software 312 can be disabled or enabled by a user of the client computer at any time.

Figure 5:
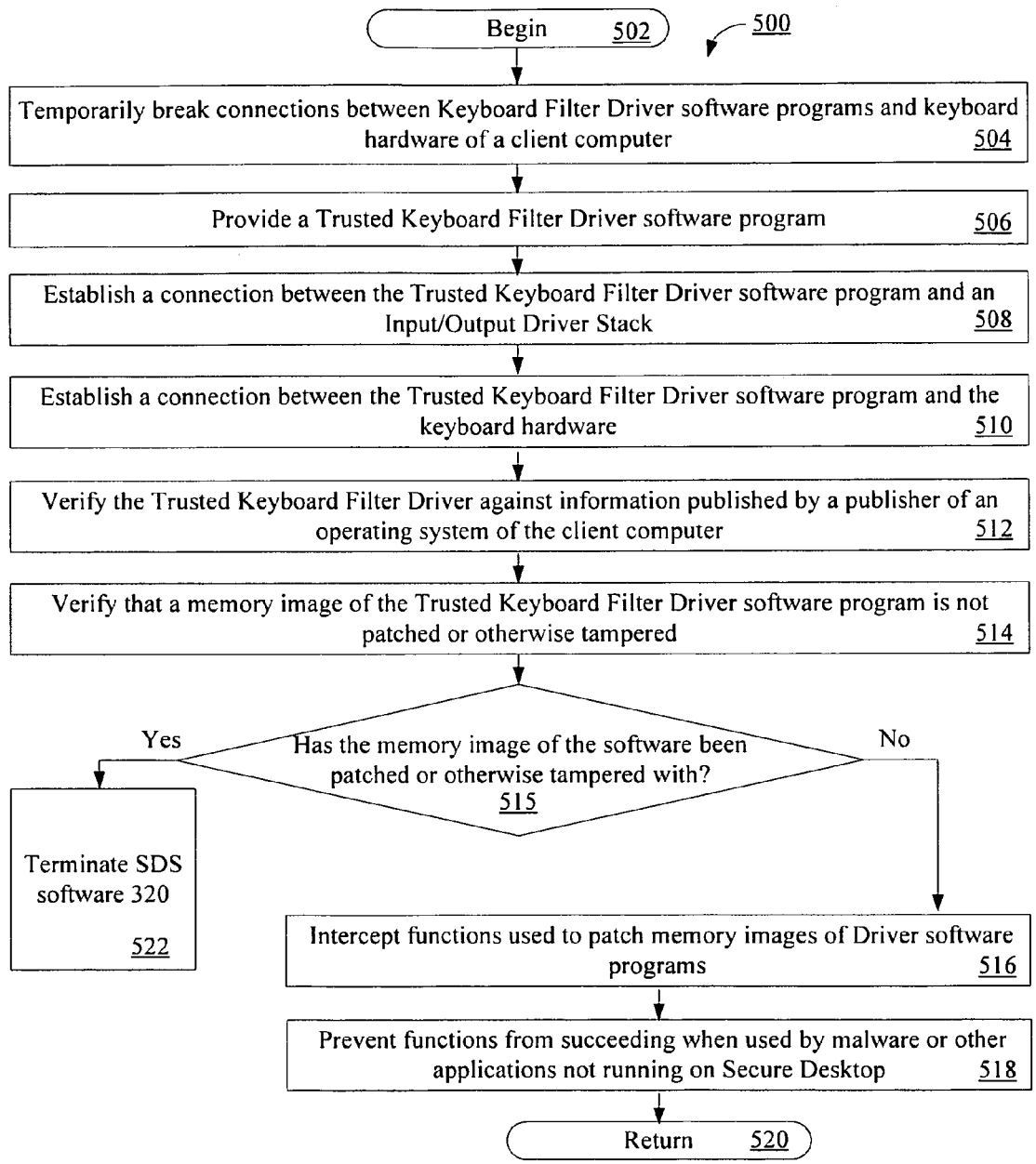
FIG. 5 is a flow diagram of an exemplary method for providing keyboard security feature to the client computer shown in FIG. 1 according to embodiment of the present invention.

Referring now to FIG. 5, there is provided a flow diagram of an exemplary method 500 for providing keyboard security features according to embodiment of the present invention. Notably, the method 500 can be performed in step 463 of FIG. 4C. As shown in FIG. 5, the method 500 begins with step 502 and continues to step 504. In step 504, connections between Keyboard Filter Driver software programs (e.g., the Keyboard Filter Driver software programs $360_1$, $360_2$ (not shown in FIG. 3), . . . , $360_n$ of FIG. 3) and keyboard hardware (e.g., the keyboard hardware 364 shown in FIG. 3) are temporarily broken. Thereafter, a Trusted Keyboard Filter Driver software program (e.g., the Trusted Keyboard Filter Driver software program 362 of FIG. 3) is provided in step 506. Connections are established in step 508 between the Trusted Keyboard Filter Driver software program and an I/O Driver Stack software (e.g., the I/O Drive Stack software 366 of FIG. 3). Similarly, connections are established in step 510 between the Trusted Keyboard Filter Driver software program and keyboard hardware.

In step 512, the Trusted Keyboard Filter Driver software can be verified against information published by a publisher of an operating system of the client computer. If the Trusted Keyboard Filter Driver software includes information that conflicts with the publisher's information, then SDS software 320 can be terminated. Similarly in step 514, a memory image of the Trusted Keyboard Filter Driver software can be verified to determine if it has been patched or otherwise tampered with by comparing memory images of the Trusted Filter Driver software with the disk image of the Trusted Filter Driver software. In addition, a digital signature of the Trusted Filter Driver software can be verified to be intact. It should be understood that steps 512 and 514 can be performed prior to (not shown) or subsequent to (as shown in FIG. 5) steps 508 and 510.

Upon completing step 514, the method 500 continues with a decisions step 515. If the memory image of the Trusted Keyboard Filter Driver software has been patched or otherwise tampered with [515:YES], then step 522 is performed where the SDS software 320 is terminated. In contrast, if the memory image of the Trusted Keyboard Filter Driver software program has not been patched or otherwise tampered with [515:NO], the step 516 is performed. In step 516, functions used to patch memory images of device drivers are intercepted. Thereafter, step 518 is performed where the functions are prevented from succeeding if they are being used by malware or other applications not running on the Secure Desktop. In a next step 520, the method 500 returns to step 502 or subsequent processing is resumed.

Figure 6:
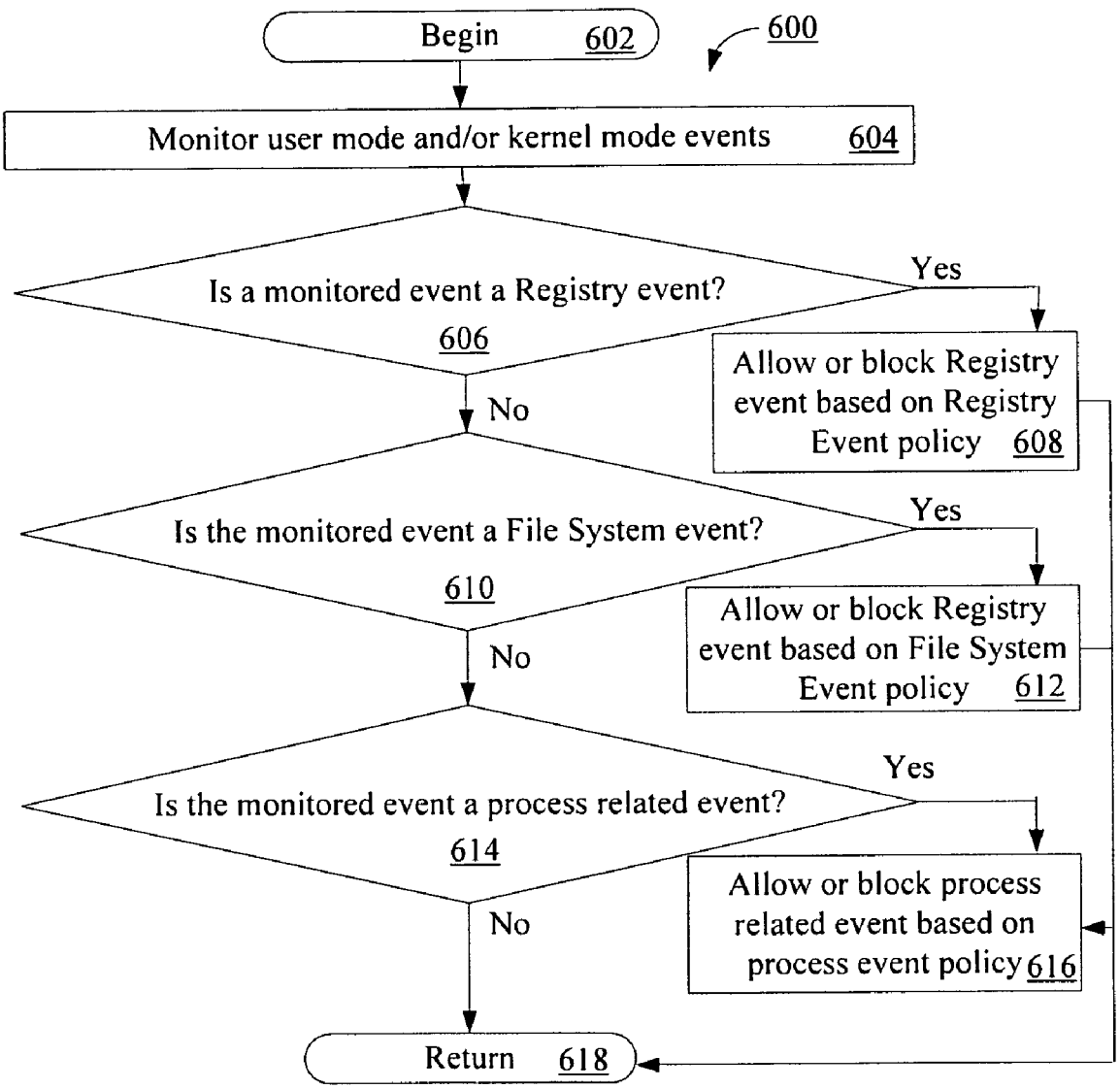
FIG. 6 is a flow diagram of an exemplary method for protecting registry keys and/or files from being modified and/or deleted according to an embodiment of the present invention.

Referring now to FIG. 6, there is provided a flow diagram of an exemplary method 600 for protecting registry keys and/or files from being modified and/or deleted according to an embodiment of the present invention. The method 600 can be performed in step 417 of FIG. 4A and/or in step 472 of FIG. 4D. The method 600 can be performed by the TSX Core software 312 of FIG. 3.

As shown in FIG. 6, the method 600 begins with step 602 and continues to step 604. In step 604, user-mode and/or kernel mode events are monitored. If a monitored event is a Registry event [606:YES], then step 608 is performed where the Registry event is allowed or blocked based on a predefined Registry Event policy. The phrase "Registry event", as used herein, refers to events that involve changes in registry keys (e.g., a write event changing a value of a registry key or a delete event deleting a registry key). The phrase "Registry Event policy", as used herein, refers to a pre-defined rule to be applied to one or more registry keys as enumerated in a policy that is being accessed by software running on a computer system (e.g., a Registry key A allows read, block write, or delete). Subsequent to allowing or blocking the Registry event, step 618 is performed where the method returns to step 602 or subsequent processing is performed. If a monitored event is not a Registry event [606:NO], then a decision step 610 is performed for determining if the monitored event is a File System event.

If the monitored event is a File System event [610:YES], then step 612 is performed where the File System event is allowed or blocked based on a predefined File System Event policy. The phrase "File System event", as used herein, refers to events that involve changes in files (e.g., a write event modifying a file or a delete event deleting a file). The phrase "File System Event policy", as used herein, refers to a pre-defined rule to be applied to one or more files as enumerated in a policy that is being accessed by software running on a computer system (e.g., a pre-defined rule allows read operations, block write operation, or delete operations). Thereafter, step 618 is performed where the method 600 returns to step 602 or subsequent processing is resumed.

If the monitored event is not a File System event [610:NO], then a decision step 614 is performed where a decision is made as to whether the monitored event is a process related event. If the monitored event is a process related event [614:YES], then step 616 is performed. Step 616 involves allowing or blocking process related events based on process event policy. Upon completing step 616, step 618 is performed where the method 600 returns to step 604 or subsequent processing is resumed. If the monitored event is not a process related event [614:NO], then the method 600 returns to step 602 or subsequent processing is resumed.

Figure 7:
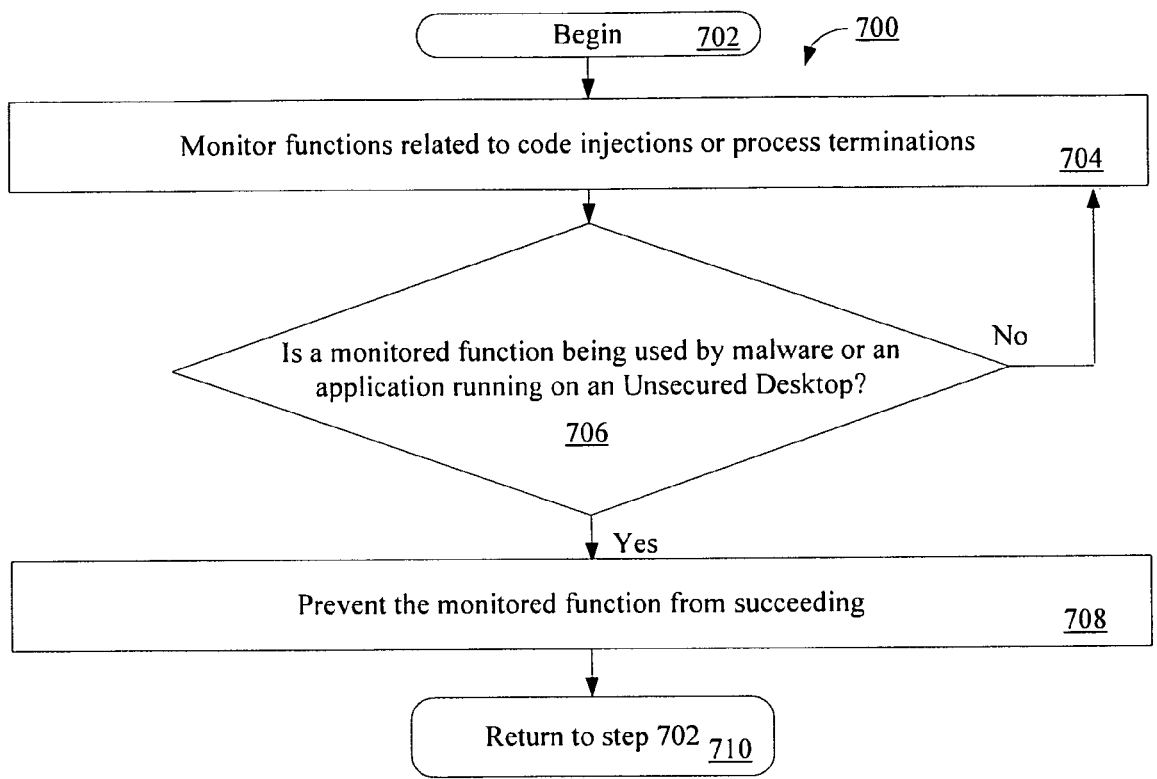
FIG. 7 is a flow diagram of an exemplary method for preventing code from being injected into a running Secure Browser and/or a running Secure Desktop Solution (SDS) Client Application according to an embodiment of the present invention.

Referring now to FIG. 7, there is provided a flow diagram of an exemplary method 700 for preventing code from being injected into a running Secure Browser and/or a running SDS Client Application according to an embodiment of the present invention. The method 700 can be performed in step 417 of FIG. 4A and/or in step 474 of FIG. 4D. The method 700 is at least partially performed by the TSX Core software 312 of FIG. 3.

As shown in FIG. 7, the method 700 begins with step 702 and continues to step 704. In step 704, functions related to code injections or process terminations are monitored. These functions are well known to those having ordinary skill in the art, and therefore will not be described in detail herein. However, it should be understood that the code injection functions can include, but are not limited to, Structured Query Language (SQL) code injection functions to arbitrarily modify stored data, exploitation functions to exploit code injection vulnerabilities in web browsers and/or web browser plugins when a user of a client computer visits a malicious website, and exploitation functions to exploit shell injection vulnerabilities in a service (e.g., services 306 of FIG. 3), and Hyper Text Markup Language/Script injection functions to steal sessions and/or cookies from web browsers.

Subsequent to step 704, a decision step 706 is performed where a determination is made as to whether a monitored function is being used by malware or an application running on an Unsecured Desktop. This determination is made by the TSX Core software which tracks monitored functions through various interception methods and access origin verification methods when software on the client computer 102 tries to use the monitored functions. An access origin verification method can generally involve tracing back into a process by reversing on a path of software that is trying to use the monitored functions of an operating system. For example, a caller points to a process in memory and a process in memory points to a disk image. The disk image points to a publisher if it is an authentic program (not malware). Malware typically does not refer to a publisher. Accordingly, if a disk image does not point to a publisher, then the monitored function is deemed to be a monitored function being used by malware.

If the monitored function is not being used by malware or an application running on an Unsecured Desktop (e.g., the Unsecured Desktop 902 shown in FIG. 9) [706:NO], then step 704 is performed again. If the monitored function is being used by malware or an application running on an Unsecured Desktop (e.g., the Unsecured Desktop 902 shown in FIG. 9) [706:YES], then step 708 is performed where the monitored function is prevented from succeeding. Thereafter, step 710 is performed where the method 700 returns to step 702 or subsequent processing is resumed.

Figure 8:
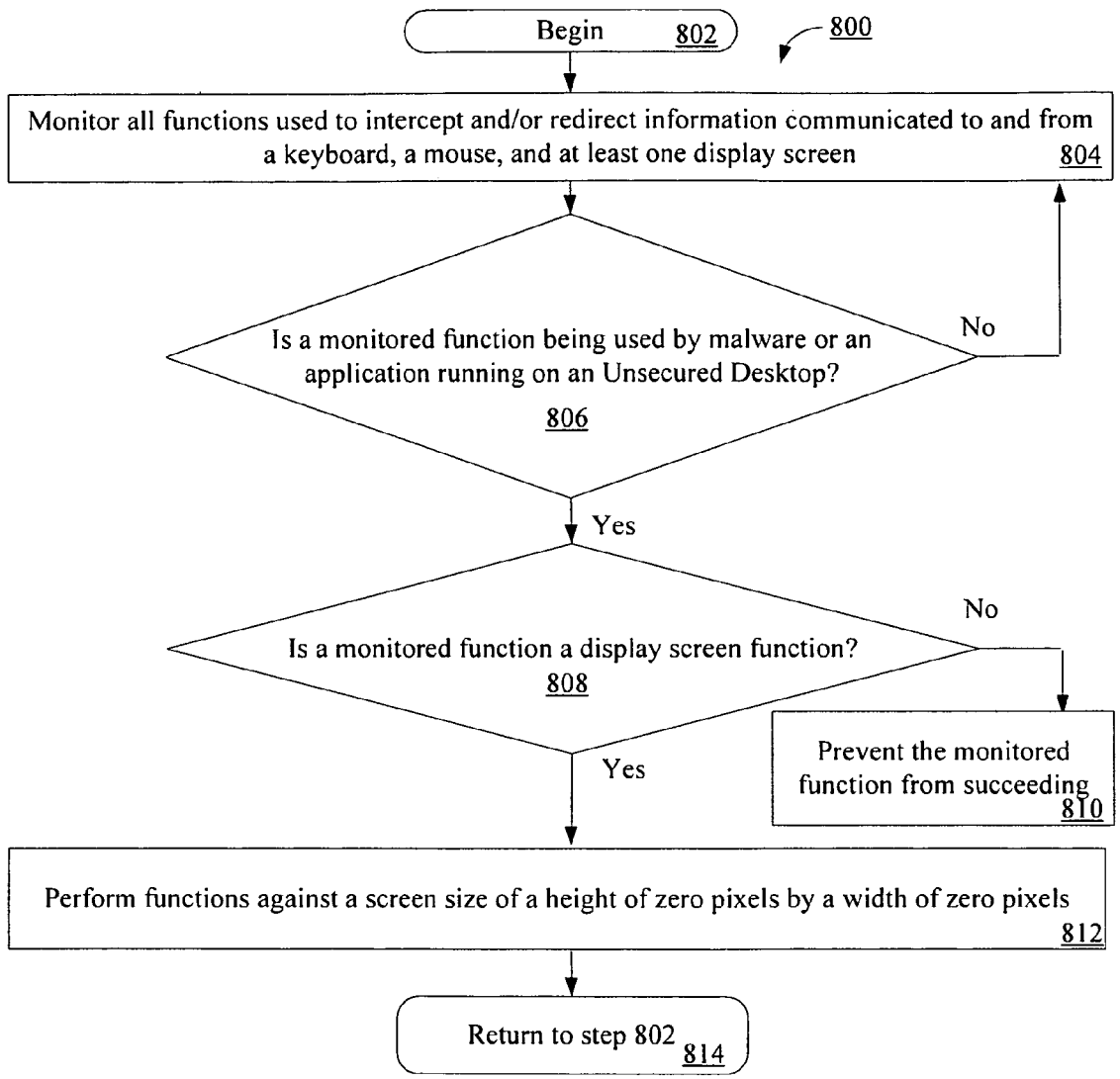
FIG. 8 is a flow diagram of an exemplary method for preventing screen scrapers from capturing information displayed on a Secure Desktop according to an embodiment of the present invention.

Referring now to FIG. 8, there is provided a flow diagram of an exemplary method 800 for preventing screen scrapers from capturing information displayed on a Secure Desktop according to an embodiment of the present invention. The method 800 can be performed in step 476 of FIG. 4D. The method 700 can also be performed by the TSX Core software 312 of FIG. 3.

As shown in FIG. 8, the method 800 begins with step 802 and continues to step 804. In step 804, all functions used to intercept and/or redirect information communicated to and from certain hardware is monitored. These functions are well known to those having ordinary skill in the art, and therefore will not be described herein. However, it should be understood that the code injection functions can include, but are not limited to, I/O interception functions and I/O redirection functions. The hardware can include, but is not limited to, a keyboard (not shown), a mouse (not shown), and a display screen (e.g., the display screen 204 of FIG. 2).

Subsequent to completing step 804, the method 800 continues with a decision step 806 where a determination is made as to whether a monitored function is being used by malware or an application running on an Unsecure Desktop. This determination is made by the TSX Core software which tracks monitored functions through various interception methods and access origin verification methods when software on the client computer 102 tries to use the monitored functions. As described above, an access origin verification method can generally involve tracing back into a process by reversing on a path of software that is trying to use the monitored functions of an operating system. For example, a caller points to a process in memory and a process in memory points to a disk image. The disk image points to a publisher if it is an authentic program (not malware). Malware typically does not refer to a publisher. Accordingly, if a disk image does not point to a publisher, then the monitored function is deemed to be a monitored function being used by malware.

If a monitored function is being used by malware or an application running on an Unsecure Desktop (e.g., the Unsecure Desktop 902 of FIG. 9) [806:YES], then the method 800 continues with a decision step 808. In contrast, if the monitored function is not being used by malware or an application running on an Unsecure Desktop [806:NO], then step 804 is performed again.

The decision step 808 involves determining if the monitored function is a display screen function. This determination is made by the TSX Core software 312 which tracks monitored functions through various interception methods and access origin verification methods when software on the client computer 102 tries to use the monitored functions. Monitored display screen functions can include, but are not limited to, print screen functions, save screen to clipboard functions, and copy screen to remote desktop of another computer system functions. If the monitored function is not a display screen function [808:NO], then step 810 is performed where the monitored function is prevented from succeeding. If the monitored function is a display screen function [808:YES], then step 812 is performed. In step 812, the display screen function is performed against a screen size of a height of zero (0) pixels by a width of zero (0) pixels. Accordingly, the display screen appears to a screen scraping means as being absent of displayed data. In effect, the screen scraping means has been effectively disabled. Upon completing step 812, step 814 is performed where the method 800 returns to step 802 or subsequent processing is performed.

In light of the forgoing description of the invention, it should be recognized that the present invention can be realized in hardware, software, or a combination of hardware and software. A method for providing a trusted secure desktop according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for simultaneously protecting a plurality of software components installed on a computer system against malware, comprising:
    executing a trusted secure desktop simultaneously with an unsecure desktop of the computer system;
    executing at least one first end user application installed on the computer system which executes in user mode on the trusted secure desktop; and
    performing at least one security service operation that is initiated by said trusted secure desktop in kernel-mode at the computer system to protect the first end user application at least against a kernel-mode keylogger and a kernel-mode rootkit.

2. The method according to claim 1, wherein the at least one security service operation is performed by the trusted secure desktop and an underlying security software including a user mode software configured to communicate with the trusted secure desktop and a kernel mode software configured to communicate with the user mode software and an operating system of the computer system.

3. The method according to claim 1, wherein the first end user application is a web browser application.

4. The method according to claim 3, further comprising storing the web browser application on the computer system in an encrypted form and decrypting the web browser application prior to being executed on the trusted secure desktop.

5. The method according to claim 3, further comprising defining a landing page of the web browser application to be a predefined site.

6. A method for simultaneously protecting a plurality of software components installed on a computer system against malware, comprising:
    executing a trusted secure desktop simultaneously with an unsecure desktop of the computer system;
    executing at least one first end user application installed on the computer system which executes in user mode on the trusted secure desktop; and
    performing at least one security service operation at the computer system to protect the first end user application against malware;
    wherein the security service operation includes at least one operation selected from the group consisting of a keylogger prevention service operation, a code injection prevention service operation, a screen scraper protection service operation, a process termination prevention service operation, and a Domain Name System service operation.

7. A method for simultaneously protecting a plurality of software components installed on a computer system against malware, comprising:
    executing a trusted secure desktop simultaneously with an unsecure desktop of the computer system;
    executing at least one first end user application installed on the computer system which executes in user mode on the trusted secure desktop; and
    performing at least one security service operation at the computer system to protect the first end user application against malware;
    wherein the security service operation includes at least one operation selected from the group consisting of a keylogger prevention service operation, a code injection prevention service operation, a screen scraper protection service operation, a process termination prevention service operation, and a Domain Name System service operation; and
    wherein the keylogger prevention service operation comprises:
        temporarily breaking all connections between an operating system of the computer system and a plurality of first keyboard device drivers of the computer system; and
        establishing a connection between the operating system and a second keyboard device driver that has been verified to be an unpatched or untampered device driver.

8. The method according to claim 7, wherein the keylogger prevention service operation further comprises:
    intercepting at least one function used to patch memory images of the second keyboard device driver; and
    preventing the function from succeeding if the function is determined to be used by malware.

9. A method for simultaneously protecting a plurality of software components installed on a computer system against malware, comprising:
    executing a trusted secure desktop simultaneously with an unsecure desktop of the computer system;

executing at least one first end user application installed on the computer system which executes in user mode on the trusted secure desktop; and performing at least one security service operation at the computer system to protect the first end user application against malware;

wherein the security service operation includes at least one operation selected from the group consisting of a keylogger prevention service operation, a code injection prevention service operation, a screen scraper protection service operation, a process termination prevention service operation, and a Domain Name System service operation; and wherein the code injection prevention service operation comprises:

monitoring a plurality of code injection functions being performed by the computer system; and preventing at least one code injection function of the plurality of code injection functions from succeeding if the code injection function is determined to be used by malware.

10. A method for simultaneously protecting a plurality of software components installed on a computer system against malware, comprising:

executing a trusted secure desktop simultaneously with an unsecure desktop of the computer system;

executing at least one first end user application installed on the computer system which executes in user mode on the trusted secure desktop; and performing at least one security service operation at the computer system to protect the first end user application against malware;

wherein the security service operation includes at least one operation selected from the group consisting of a keylogger prevention service operation, a code injection prevention service operation, a screen scraper protection service operation, a process termination prevention service operation, and a Domain Name System service operation; and wherein the screen scraper protection service operation comprises:

monitoring a plurality of functions performed by the computer system used to intercept or redirect information communicated to and from a keyboard, a mouse, and a display screen;

intercepting the plurality of functions; and preventing at least one function of the plurality of functions from succeeding if the function is a non-display screen function and is determined to be used by malware or at least one second end-user application running on the unsecure desktop.

11. A method for simultaneously protecting a plurality of software components installed on a computer system against malware, comprising:

executing a trusted secure desktop simultaneously with an unsecure desktop of the computer system;

executing at least one first end user application installed on the computer system which executes in user mode on the trusted secure desktop; and performing at least one security service operation at the computer system to protect the first end user application against malware;

wherein the security service operation includes at least one operation selected from the group consisting of a keylogger prevention service operation, a code injection prevention service operation, a screen scraper protection service operation, a process termination prevention service operation, and a Domain Name System service operation; and wherein the screen scarper protection service operation comprises:

monitoring a plurality of functions performed by the computer system used to intercept or redirect information communicated to and from a keyboard, a mouse, and a display screen;

intercepting the plurality of functions; and performing the function against a screen size of a height of zero pixels and a width of zero pixels if the function is a display screen function and is determined to be used by malware or at least one second end-user application running on the unsecure desktop.

12. A method for simultaneously protecting a plurality of software components installed on a computer system against malware, comprising:

executing a trusted secure desktop simultaneously with an unsecure desktop of the computer system;

executing at least one first end user application installed on the computer system which executes in user mode on the trusted secure desktop;

performing at least one security service operation that is initiated by said trusted secure desktop in kernel-mode at the computer system to protect the first end user application at least against kernel-mode malware;

scanning program data stored in a memory device of the computer system associated with a plurality of user mode and kernel mode applications running on the unsecure desktop for malware prior to launching the trusted secure desktop and the first end user application; and preventing at least one of the trusted secure desktop and the first end user application from launching if the program data includes the malware.

13. The method according to claim 12, further comprising running an anti-virus/spyware software installed on the computer system to identify and remove the malware from the computer system; and allowing the trusted secure desktop and the first end user application to be launched subsequent to the removal of the malware from the computer system.

14. A method for simultaneously protecting a plurality of software components installed on a computer system against malware, comprising:

executing a trusted secure desktop simultaneously with an unsecure desktop of the computer system;

executing at least one first end user application installed on the computer system which executes in user mode on the trusted secure desktop; and performing at least one security service operation at the computer system to protect the first end user application against malware;

wherein the security service operation includes at least one operation selected from the group consisting of a keylogger prevention service operation, a code injection prevention service operation, a screen scraper protection service operation, a process termination prevention service operation, and a Domain Name System service operation; and wherein the Domain Name System service operation comprises:

generating a DNS resolution request at the computer system;

communicating the DNS resolution request from the computer system to a DNS server computer system for translation of a domain name for a network site to a numerical identifier; and receiving the numerical identifier at the computer system.

15. A computer system, comprising:
a computer readable medium having a plurality of instructions stored thereon; and
at least one processing device communicatively coupled to the computer readable medium and configured for executing the plurality of instructions that cause the computer system to (a) execute a trusted secure desktop simultaneously with an unsecure desktop, (b) execute a first end user application on the trusted secure desktop, and (c) perform at least one security service operation that is initiated by said trusted secure desktop in kernel-mode to protect the first end user application at least against a kernel-mode keylogger and a kernel-mode rootkit.

16. The computer system according to claim 15, wherein the security service operation is performed by the trusted secure desktop and an underlying security software including a user mode software configured to communicate with the trusted secure desktop and a kernel mode software configured to communicate with the user mode software and an operating system of the computer system.

17. The computer system according to claim 15, wherein the first end user application is a web browser application.

18. The computer system according to claim 17, wherein the web browser application is stored on the computer readable medium in an encrypted format, and the processing device is further configured for decrypting the web browser application prior to being executed on the first desktop.

19. A computer system, comprising:
a computer readable medium having a plurality of instructions stored thereon; and
at least one processing device communicatively coupled to the computer readable medium and configured for executing the plurality of instructions that cause the computer system to (a) execute a trusted secure desktop simultaneously with an unsecure desktop, (b) execute a first end user application on the trusted secure desktop, and (c) perform at least one security service operation to protect the first end user application against malware;
wherein the security service operation is selected from the group consisting of a keylogger prevention service operation, a code injection prevention service operation, a screen scraper protection service operation, a process termination prevention service operation, and a Domain Name System (DNS) service operation.

20. A computer system, comprising:
a computer readable medium having a plurality of instructions stored thereon; and
at least one processing device communicatively coupled to the computer readable medium and configured for executing the plurality of instructions that cause the computer system to (a) execute a trusted secure desktop simultaneously with an unsecure desktop, (b) execute a first end user application on the trusted secure desktop, and (c) perform at least one security service operation to protect the first end user application against malware;
wherein the security service operation is selected from the group consisting of a keylogger prevention service operation, a code injection prevention service operation, a screen scraper protection service operation, a process termination prevention service operation, and a Domain Name System (DNS) service operation; and
wherein the keylogger prevention service operation comprises
temporarily breaking all connections between an operating system of the computer system and a plurality of first keyboard device drivers of the computer system, and
establishing a connection between the operating system and a second keyboard device driver that has been verified to be an unpatched or untampered device driver.

21. The computer system according to claim 20, wherein the keylogger prevention service operation further comprises
intercepting at least one function used to patch memory images of the second keyboard device driver, and
preventing the function from succeeding if the function is being used by malware.

22. A computer system, comprising:
a computer readable medium having a plurality of instructions stored thereon; and
at least one processing device communicatively coupled to the computer readable medium and configured for executing the plurality of instructions that cause the computer system to (a) execute a trusted secure desktop simultaneously with an unsecure desktop, (b) execute a first end user application on the trusted secure desktop, and (c) perform at least one security service operation to protect the first end user application against malware;
wherein the security service operation is selected from the group consisting of a keylogger prevention service operation, a code injection prevention service operation, a screen scraper protection service operation, a process termination prevention service operation, and a Domain Name System (DNS) service operation; and
wherein the code injection prevention operation comprises
monitoring a plurality of code injection functions being performed by the computer system, and
preventing at least one code injection function of the plurality of code injection functions from succeeding if the code injection function is being used by malware.

23. A computer system, comprising:
a computer readable medium having a plurality of instructions stored thereon; and
at least one processing device communicatively coupled to the computer readable medium and configured for executing the plurality of instructions that cause the computer system to (a) execute a trusted secure desktop simultaneously with an unsecure desktop, (b) execute a first end user application on the trusted secure desktop, and (c) perform at least one security service operation to protect the first end user application against malware;
wherein the security service operation is selected from the group consisting of a keylogger prevention service operation, a code injection prevention service operation, a screen scraper protection service operation, a process termination prevention service operation, and a Domain Name System (DNS) service operation; and
wherein the screen scraper protection operation comprises
monitoring a plurality of functions performed by the computer system used to intercept or redirect information communicated to and from a keyboard, a mouse, and a display screen,
intercepting the plurality of functions, and
preventing at least one function of the plurality of functions from succeeding if the function is a non-display screen function and is being used by malware or at least one second end-user application running on the unsecure desktop.

24. A computer system, comprising:
a computer readable medium having a plurality of instructions stored thereon; and
at least one processing device communicatively coupled to the computer readable medium and configured for executing the plurality of instructions that cause the computer system to (a) execute a trusted secure desktop simultaneously with an unsecure desktop, (b) execute a first end user application on the trusted secure desktop, and (c) perform at least one security service operation to protect the first end user application against malware;
wherein the security service operation is selected from the group consisting of a keylogger prevention service operation, a code injection prevention service operation, a screen scraper protection service operation, a process termination prevention service operation, and a Domain Name System (DNS) service operation; and
wherein the screen scraper protection operation comprises
monitoring a plurality of functions performed by the computer system used to intercept or redirect information communicated to and from a keyboard, a mouse, and a display screen,
intercepting the plurality of functions, and
performing the function against a screen size of a height of zero pixels and a width of zero pixels if the function is a display screen function and is being used by malware or at least one second end-user application running on the unsecure desktop.

25. A computer system, comprising:
a computer readable medium having a plurality of instructions stored thereon; and
at least one processing device communicatively coupled to the computer readable medium and configured for executing the plurality of instructions that cause the computer system to (a) execute a trusted secure desktop simultaneously with an unsecure desktop, (b) execute a first end user application on the trusted secure desktop, and (c) perform at least one security service operation that is initiated by said trusted secure desktop in kernel-mode to protect the first end user application at least against kernel-mode malware;
wherein the processing device is further configured for
scanning program data stored in the computer system associated with a plurality of user mode and kernel mode applications running on the unsecure desktop for malware prior to launching the trusted secure desktop and the first end user application; and
preventing at least one of the trusted secure desktop and the first end user application from launching if the program data includes the malware.

26. The computer system according to claim 25, wherein the processing device is further configured for
running an anti-virus/spyware software to identify and remove the malware from the computer system, and
allowing the trusted secure desktop and the first end user application to be launched subsequent to the removal of the malware from the computer system.

* * * * *